US010936600B2

(12) United States Patent
Hariharan et al.

(10) Patent No.: US 10,936,600 B2
(45) Date of Patent: Mar. 2, 2021

(54) SENSOR TIME SERIES DATA: FUNCTIONAL SEGMENTATION FOR EFFECTIVE MACHINE LEARNING

(71) Applicant: Oracle International Corporation, Redwood Shores, CA (US)

(72) Inventors: Sreeram Hariharan, Santa Clara, CA (US); Ramchand Raman, Redwood City, CA (US); Gopal Raja Ratnam, Redwood City, CA (US); Bryan Siu Him So, Hayward, CA (US); Usha Arora, Sunnyvale, CA (US); Ganga Mohan Nookala, Miyapur (IN); Krishna Jonnalagadda, Secunderabad (IN); Pushkala Nagasuri, Bangalore (IN); Swathi Uppala, Bangalore (IN); Sangeetha Mani, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 743 days.

(21) Appl. No.: 15/331,258

(22) Filed: Oct. 21, 2016

(65) Prior Publication Data

US 2017/0116524 A1   Apr. 27, 2017

Related U.S. Application Data

(60) Provisional application No. 62/245,462, filed on Oct. 23, 2015.

(51) Int. Cl.
*G06F 16/248* (2019.01)
*G06N 20/00* (2019.01)
(Continued)

(52) U.S. Cl.
CPC ...... *G06F 16/24575* (2019.01); *G06F 16/248* (2019.01); *G06F 16/258* (2019.01); *G06F 16/285* (2019.01); *G06N 20/00* (2019.01)

(58) Field of Classification Search
CPC .............. G06F 16/24575; G06F 16/248; G06F 16/258; G06F 16/285; G06N 3/126; G06N 5/047
See application file for complete search history.

(56) References Cited

U.S. PATENT DOCUMENTS 8,688,620 B2   4/2014   Viswanathan et al.
8,713,049 B2   4/2014   Jain et al.
(Continued)

FOREIGN PATENT DOCUMENTS

| WO | WO-2014198052 A1 * | 12/2014 | ............. G06F 17/18 |
| WO | 2015009310 | 1/2015 | |
| WO | WO-2017022234 A1 * | 2/2017 | ........... G05B 19/418 |

OTHER PUBLICATIONS

Global SMT & Packaging "Manufacturing execution systems vs. ERP/MRP", 2011 (Year: 2011).*
(Continued)

*Primary Examiner* — Li B. Zhen
*Assistant Examiner* — Selene A. Haedi
(74) *Attorney, Agent, or Firm* — Kilpatrick Townsend & Stockton LLP

(57) ABSTRACT

Feature engineering can be performed on time series data making the data easy to manipulate and accessible to business users for analysis according to existing best practices. A computer system can, after receiving time series data related to a device, contextualize the time series data based on business data related to the device from, for example, an enterprise resource planning database. The contextualized data can be windowed by a selected feature based on execution data related to the device from, for example, a (Continued)

manufacturing execution system database. The windowed data can be transformed into summary data using a time series transformation. The summary data can be easily manipulated by, for example, generating genetic maps of the segmented and transformed data for clustering or searching for anomalies and patterns in response to user requests or automatically.

20 Claims, 19 Drawing Sheets

(51) Int. Cl.
    *G06F 16/2457*     (2019.01)
    *G06F 16/25*     (2019.01)
    *G06F 16/28*     (2019.01)

(56) References Cited

U.S. PATENT DOCUMENTS

| | | | |
|---|---|---|---|
| 9,152,672 B2 | 10/2015 | Lin et al. | |
| 2003/0154144 A1* | 8/2003 | Pokorny | G05B 13/0285 705/28 |
| 2014/0365149 A1 | 12/2014 | Hao et al. | |
| 2015/0045700 A1 | 2/2015 | Cavanagh et al. | |
| 2016/0328432 A1* | 11/2016 | Raghunathan | G06F 16/2228 |
| 2018/0267522 A1* | 9/2018 | Kawai | G05B 19/418 |

OTHER PUBLICATIONS

Harris, "Anomaly Detection in Rolling Element Bearings via Two-Dimensional Symbolic Aggregate Approximation", 2013 (Year: 2013).*
Kumar et al, "Time-series Bitmaps: A Practical Visualization Tool for working with Large Time Series Databases", 2005 (Year: 2005).*
Oracle Manufacturing Operations Center, Oracle Data Sheet, Oracle E-Business Suite Manufacturing, 2015, 6 pages.
Bersch et al., Sensor Data Acquisition and Processing Parameters for Human Activity Classification, Sensors, vol. 14, No. 3, Available Online: https://www.ncbi.nlm.nih.gov/pmc/articles/PMC4003942/pdf/sensors-14-04239.pdf, Mar. 2014, pp. 4239-4270.
Spiegel et al., Pattern Recognition in Multivariate Time Series, Dissertation Proposal, PIKM'11, Oct. 28, 2011, 7 pages.
Welcome to the SAX (Symbolic Aggregate approximation) Homepage!, retrieved from the internet: http://www.cs.ucr.edu/~eamonn/SAX.htm, retrieved on Feb. 8, 2017, 4 pages.
Keogh et al., HOT SAX: efficiently finding the most unusual time series subsequence, In Proc. of the 5th IEEE International Conference on Data Mining (ICDM 2005), Nov. 27-30, 2005, pp. 226-233.
Lavangnananda et al., Utilizing Symbolic Representation and Evolutionary Computation in Classification of Control Chart Patterns, Jan. 2008, 6 pages.
Lin et al., A Symbolic Representation of Time Series, with Implications for Streaming Algorithms, In proceedings of the 8th ACM SIGMOD Workshop on Research Issues in Data Mining and Knowledge Discovery, Jun. 13, 2003, 10 pages.
Lin, Experiencing SAX: a Novel Symbolic Representation of Time Series, Data Mining and Knowledge Discovery, vol. 15, 2007, pp. 107-144.
Ratanamahatana et al., A Novel Bit Level Time Series Representation with Implication of Similarity Search and Clustering, Advances in Knowledge Discovery and Data Mining volume 3518 of the series Lecture Notes in Computer Science, 2005, 12 pages.
Xi et al., Finding Motifs in a Database of Shapes, Proceedings of the 2007 SIAM International Conference on Data Mining, 2007, 12 pages.
Yang et al., Discovering Patterns for Prognostics: A Case Study in Prognostics of Train Wheels, Modern Approaches in Applied Intelligence, vol. 6703 of the series Lecture Notes in Computer Science, 2011, pp. 165-175.
Yi et al., Application Research of a New Symbolic Approximation Method-SAX in Time Series Mining, Computer Engineering And Applications, vol. 42, No. 27, 2006.

* cited by examiner

CLUSTER-0

29.98 % WORK ORDER ARE IN THIS CLUSTER

CLUSTER-1

46.21 % WORK ORDER ARE IN THIS CLUSTER

CLUSTER-2

23.81 % WORK ORDER ARE IN THIS CLUSTER

SENSOR TIME SERIES DATA: FUNCTIONAL SEGMENTATION FOR EFFECTIVE MACHINE LEARNING

CROSS-REFERENCES TO RELATED APPLICATIONS

This application claims priority to provisional application No. 62/245,462 entitled SENSOR TIME SERIES DATA: FUNCTIONAL SEGMENTATION FOR EFFECTIVE MACHINE LEARNING, filed on Oct. 23, 2015, which is incorporated by reference in its entirety for all purposes.

BACKGROUND

Machine sensor data can be a time series of data with a very high dimensionality and many variations. Analysis of such data can provide beneficial information for making decisions for managing the processes associated with the machine or to identify and correct error situations. Prior industry solutions either use simple summaries or a niche solution for a specific industry that cannot be used generally for manufacturing or other devices. Typical simple summaries of time series data include average and maximum information for the series, but that information is insufficient to identify details, so key patterns are hidden within the data. Currently, one approach available to business users is Statistical Process Control ("SPC") charts. SPC charts, however, are only capable of predefined rule-based issue detection for root cause analysis. However, root cause analysis is not useful for performing investigative analysis. A solution to provide real time analysis, particularly using machine learning, and a solution that allows business users to easily review and manipulate the data to analyze the data using existing best practices are needed.

SUMMARY

A method and system are described for performing feature engineering of time series data. The system can include a memory and a processor for executing instructions stored on the memory. The instructions can cause the processor to perform the steps of the method for performing feature engineering of time series data. The method can include receiving time series data related to a device for a period of time. The time series data can include information about the device for the period of time. The method can further include contextualizing the time series data based on business data related to the device for the period of time. The method can further include feature windowing the contextualized data based on execution data related to the device for the period of time. The resulting windowed data can be a set of windows of data, which can each be transformed into summary data using a time series transformation. The summary data sets can be stored.

Optionally, transforming the windows of data into summary data can include generating a string for each window of data by normalizing the data, smoothing the data using piecewise aggregate approximation, and converting the data into a string. The method can further include converting each string into a genetic map and clustering the genetic maps to identify pattern similarities between the genetic maps. Once the patterns are identified, the genetic maps can be grouped based on the identified pattern similarities and displayed to a user.

The method can further include receiving a selection of a second time series data from a user. The second time series data can be data related to the device for a second period of time. The method can also include transforming the second time series data into summary data. The method can further include searching the first time series summary data for a pattern matching a pattern in the second time series data. Upon finding a matching pattern, the method can include displaying the summary data that has the pattern to a user. The method can further include predicting quality of a product produced during the capture of the second time series data based on the quality of the product produced during the capture of the first time series data where the patterns match.

Optionally, the time series transformation can be symbolic aggregate approximation ("SAX"). As another option, the feature windowing can be based on a time segment, a sliding window of time, or an event. In some cases, the business data can be data from an enterprise resource planning database. Optionally, the execution data can be from a manufacturing execution system database.

DETAILED DESCRIPTION

Time series data can be obtained from many devices. For example, devices connected to the Internet of Things ("IoT") are increasing in number at an astounding rate. Those devices can include sensors or other components for capturing data over time to generate time series data associated with or related to the device. Additionally, in manufacturing environments, equipment and machines used to perform manufacturing tasks can include sensors or other components to collect data for capturing data over time to generate time series data associated with or related to the equipment or machine. For example, a furnace can include a temperature sensor that can collect temperature measurements from the furnace every second to produce a time series having data points each second that represents a temperature measurement for the furnace.

Such a time series of data can include large numbers of data points. The example used above of a furnace having temperature readings every second would result in 86,400 data points over a twenty-four hour period. Further, time series data is often noisy, meaning there can be measurement noise and random noise in the time series that can distract from the real data. Additionally, the use of machine learning algorithms on such time series data is limited because machine learning does not recognize the correlation between the 86,400 data points in the example above. In a typical machine learning algorithm, the data points would be simply fed into the system, but the machine learning algorithm would not recognize the correlation between the points because machine learning expects input variables to be independent.

The following description of feature engineering resolves the problems described above. Embodiments of the present invention provide a functional way of performing feature engineering on time series data which can support effective machine learning on summarized data that has functional implications and meaning. By engineering the time series data, which can be from any source that generates time series data, into summary data, the data can be manipulated and processed with machine learning algorithms. Alternatively or additionally, the data can be provided to business users for analysis utilizing existing best practices.

Figure 1:
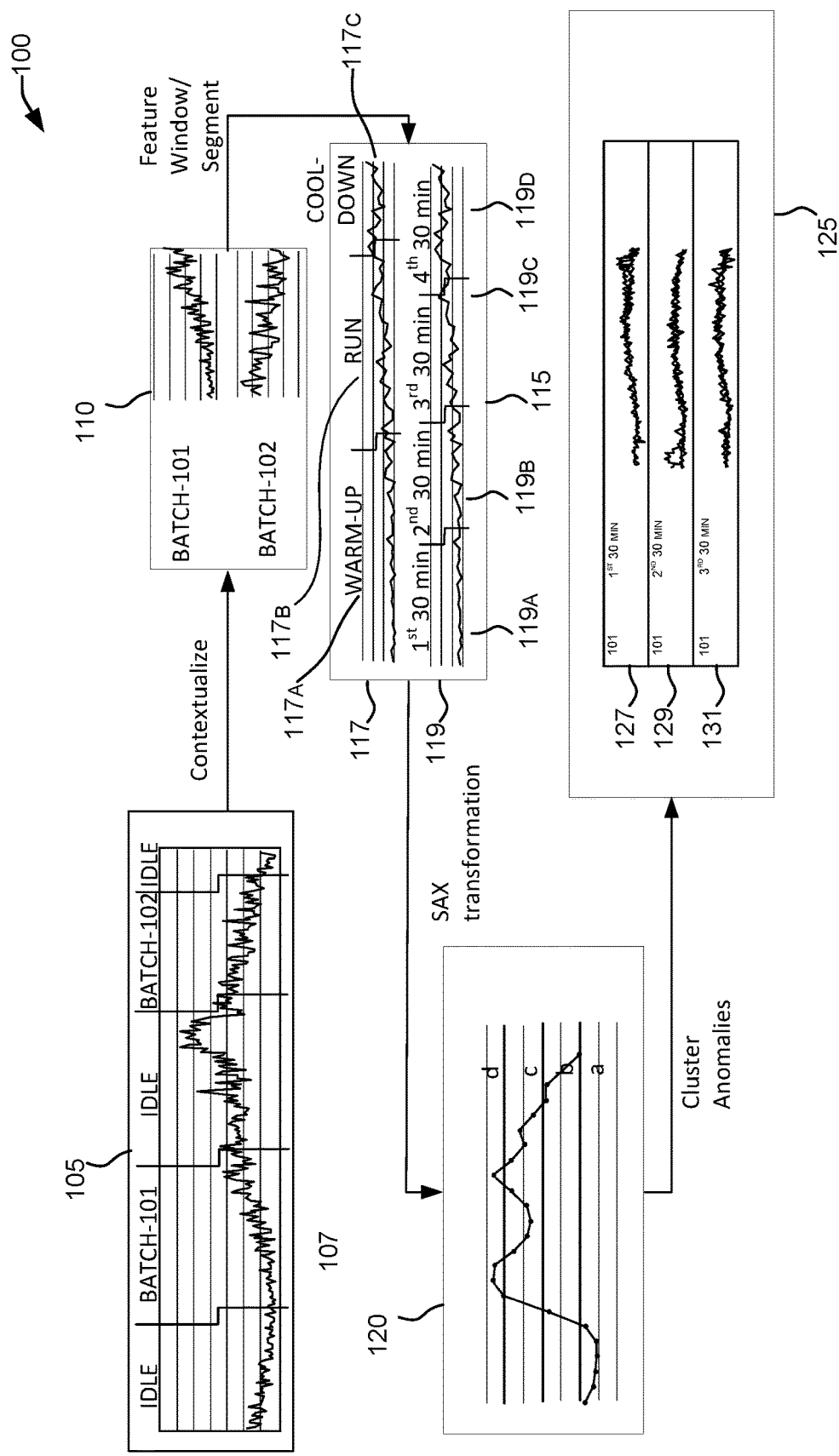
FIG. 1 is a series of graphs representing a process for feature engineering time series or machine data according to one embodiment of the present invention.

FIG. 1 is a series of graphs 100 representing a feature engineering process according to one embodiment of the present invention. The first graph, 105 contains typical time series data. The time series data can be from any device or machine. The graph 105 shows, for ease of visualization purposes only, separation lines 107, though the separation lines 107 do not exist in the raw time series data. Graph 105 can, for example, be temperature readings from a sensor associated with a furnace used for manufacturing, pressure readings from a sensor associated with a machine for manufacturing, temperature readings from a kitchen refrigerator connected to the IoT, or any other device that can generate time series data.

The second graph 110 can be the result of contextualizing the data within graph 105. When raw time series data is contextualized, information can be obtained from a source having data related to the device during the time frame (i.e., period of time) for which the time series data was generated. For example, business data or manufacturing data can be obtained and used to contextualize the raw time series data. Information such as product type, lot number, user/technician, or any other relevant data providing further information about the device or machine during the period of time for which the time series data was captured can be used for contextualizing the raw time series data. The variable upon which the time series data is contextualized can be driven by what was happening with the device or machine during the period of time. As can be seen in FIG. 1, for example, graph 110 contains the raw time series data contextualized based on batch number (i.e., BATCH-101 and BATCH-102).

The second graph 110 contains information about the batch that was being processed by the machine during the relevant portions of the time series data. This contextualized data, which is now separated into features, can further be segmented (i.e., windowed) based on, for example, a specific time segment (e.g., 30 minute increments), a sliding window of time, an event, or autowindowing can be utilized. The selection of what the windowing is based on can be selected automatically, by a user, or preconfigured. Autowindowing can be, for example, when the system automatically selects an appropriate window type and/or amount of time for windowing based on the length of time covered by the contextualized data.

The third graph 115 depicts the contextualized data in graph 110 after it has been feature windowed/segmented. The graph 115 includes two separate windowed graphs 117 and 119, both of the data from BATCH-101 of the contextualized data shown in graph 110. The top graph 117 has been windowed based on event, such that the first section 117*a* is the time when the machine was warming up, the second section 117*b* is the time when the machine was running, and the third section 117*c* is the time when the machine was cooling down. The bottom graph 119 has been windowed based on 30 minute intervals, such that the first section 119*a* is the first 30 minutes, the second section 119*b* is the second 30 minutes, the third section 119*c* is the third thirty minutes, and the fourth section 119*d* is the fourth thirty minutes.

The fourth graph 120 depicts the transformed data after having been transformed using symbolic aggregate approximation ("SAX"). SAX transformation will be described in more detail below. Once transformed, the data can be manipulated and analyzed easily to, for example, cluster the data for anomaly detection.

The fifth graph 125 depicts the data after having been contextualized, windowed, transformed, and clustered. Graph 125 contains three portions of graphs 127, 129, and 131. The top portion 127 displays the first 30 minute window of data along with other data that had been clustered with the graph 125 based on patterns identified with key information included based on the transformation and analysis to cluster the anomalies. The middle portion 129 displays the second 30 minute window of data along with other data that had been clustered with the graph 125 based on patterns identified with key information included based on the transformation and analysis to cluster the anomalies. The bottom portion 131 displays the third 30 minute window of data along with other data that had been clustered with the graph 125 based on patterns identified with key information included based on the transformation and analysis to cluster the anomalies.

Figure 2:
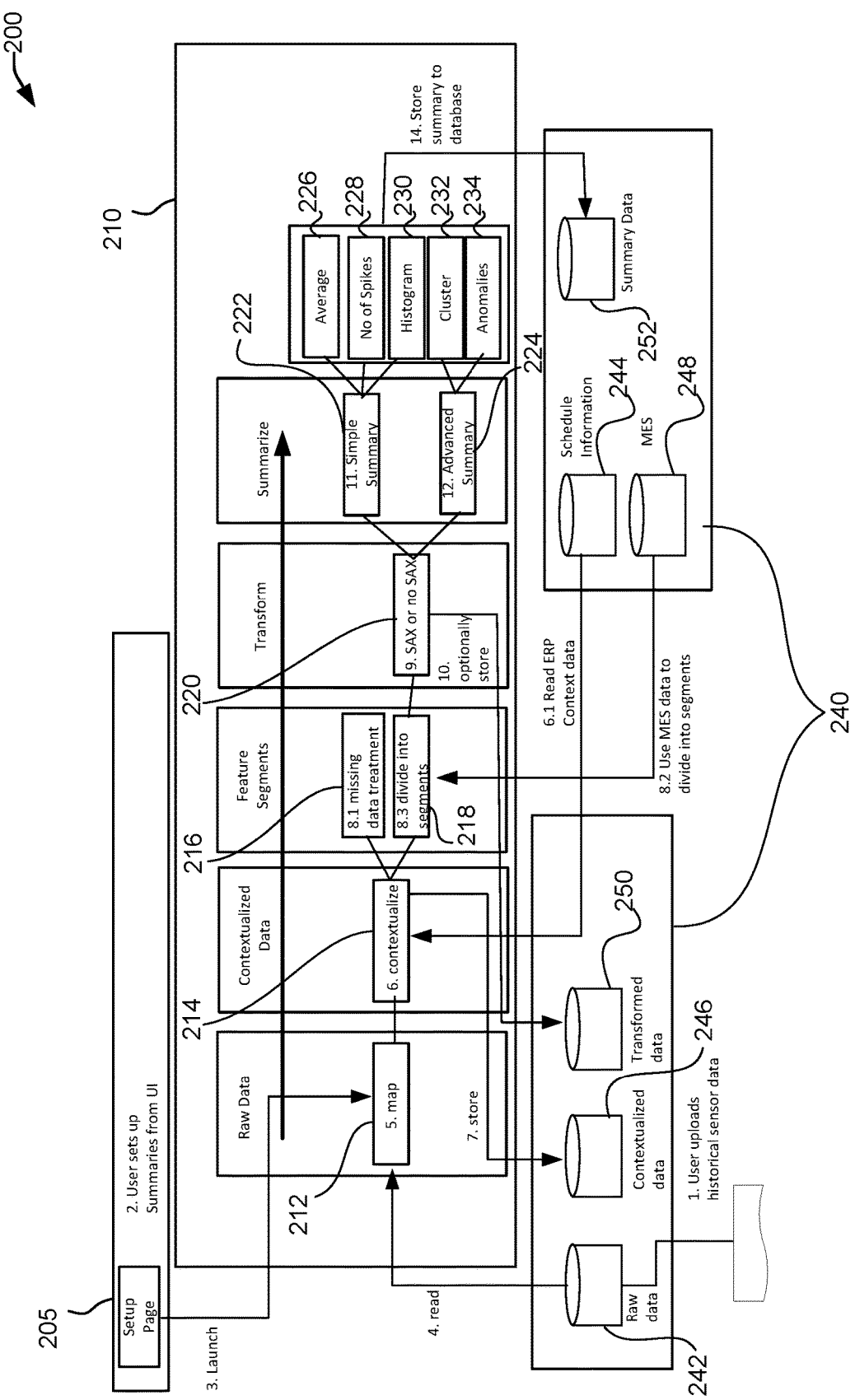
FIG. 2 is a block diagram illustrating, at a high-level, functional components of a system for feature engineering time series or machine data and performing a historical data analysis according to one embodiment of the present invention.

FIG. 2 is a block diagram illustrating, at a high-level, functional components of a system 200 for performing feature engineering on time series data (e.g., machine data) and performing a historical data analysis according to one embodiment of the present invention. The system 200 can include a user interface 205, a processing system 210, and databases 240.

As illustrated in this example, a user may upload or otherwise provide a set of historical sensor data via a setup page, via, for example the user interface 205 to be the subject of the analysis. The user can also set up via the user interface 205 a set of one or more summaries to be provided on the data. Using the user interface 205 the user can launch the analysis.

Upon launch of the analysis, the processing system 210 can obtain the historical sensor data from a raw data database 242 and map 212 the historical sensor data to the request from the user interface 205. The mapped data can be contextualized 214 based on, for example, schedule information from an enterprise resource planning database 244 containing business data regarding the device associated with the raw data. Contextualizing 214 the data can be, for example, segmenting the time series data based on data related to what was happening to the device at the time the time series data was captured. For example, business data from an enterprise resource planning database may include product information for products being manufactured by the device or machine during the capture of the time series data. Other information can include lot information or user/technician information. The time series data can be contextualized 214 by segmenting the data into context based on the business/context data. For example, the time series data can be segmented into a set of data during which time product "Alpha" was being processed and a set of data during which time product "Beta" was being processed, and a set of data for the time period between processing product "Alpha" and product "Beta." The segmented data can be considered contextualized 214 to the product. Optionally, the contextualized data can be stored, for example, in a contextualized data database 246.

The contextualized data can be further segmented 218 into windows of data. The windows of data can be selected based on, for example, execution data from a manufacturing execution system database 248. The windows (i.e., segments) can be selected based on time intervals, an event identified from the execution data, a sliding window, or using autowindowing. Autowindowing can allow the processing system 210 to select a type of windowing (e.g., sliding window, time interval, event) and, if needed, a length of time for the window (e.g., a 30 minute time interval or a 5 minute sliding window) or the events by which the data is windowed (e.g., warm-up, processing, cool down). The windowed data can be considered feature segments or feature windows because the data has already been segmented during contextualization based on a feature, and then further segmented during windowing into segments or windows of the featured data. Optionally, the contextualized data can be missing data points, which can be handled at 216.

The windowed data can be transformed at 220 using SAX or some other time series transformation. SAX transformation involves normalizing the data using a z-normalization methodology. Once normalized, the data can be smoothed by performing piecewise aggregate approximation. Finally, the smoothed data can be converted to a string. This process is described in more detail with respect to FIG. 4. Other types of transformation can include, for example, moving averages, discrete wavelet transform, and fast Fourier transform. Optionally, the transformed data can be stored, for example, in a transformed data database 250.

The transformed data can be a summary of data, such as a SAX string, which can be a simple summary 222 or an advanced summary 224. The summaries can be utilized to, for example, identify an average 226, identify the number of spikes 228, generate a histogram 228, create a cluster 230, or identify anomalies 232, each of which can also be a summary. Optionally, the summary data, including the average 224, number of spikes 226, histogram 230, cluster 232, and/or anomalies 234 can be stored in a summary data database 252.

Figure 3:
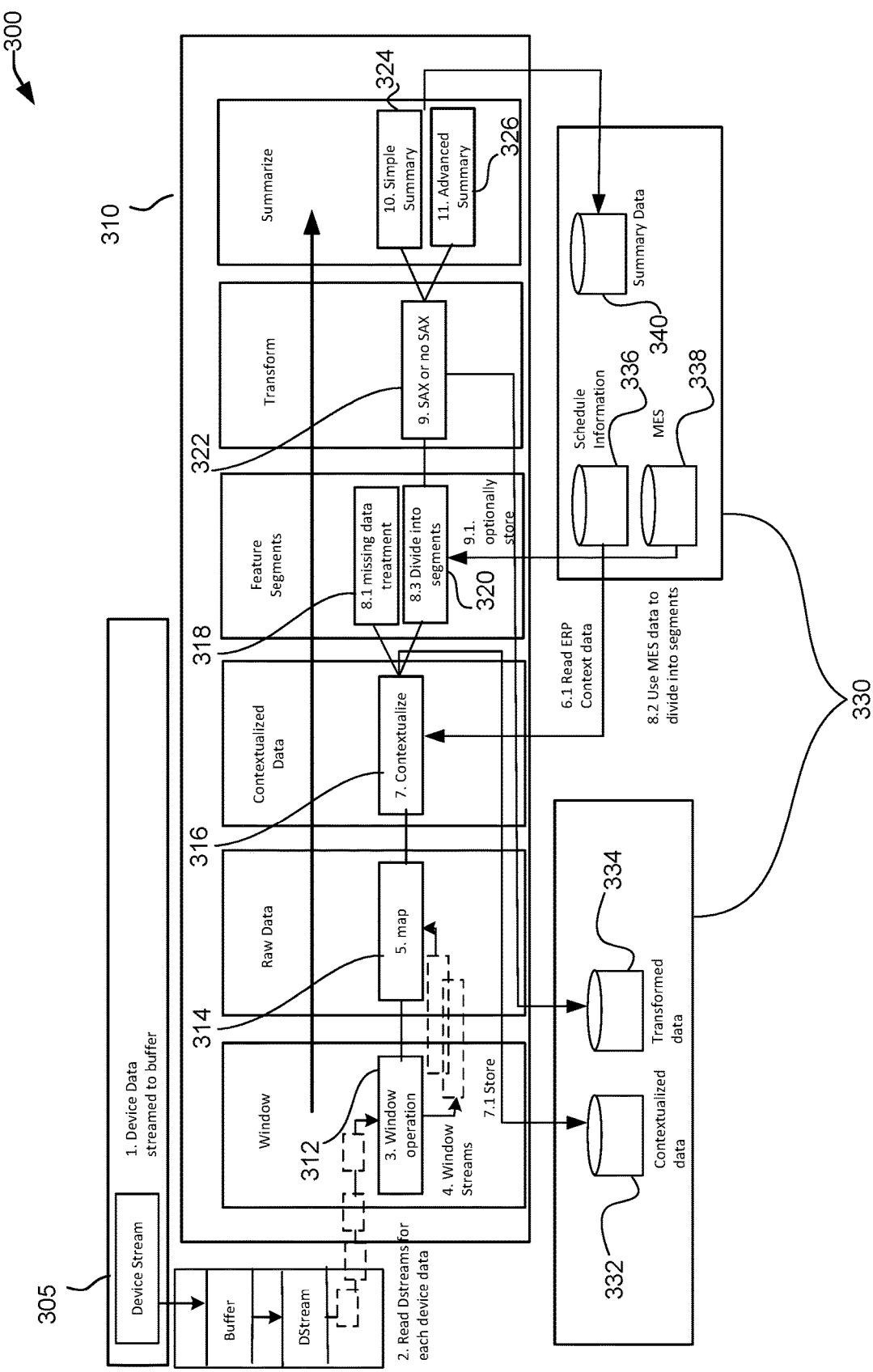
FIG. 3 is a block diagram illustrating, at a high-level, functional components of a system for feature engineering time series or machine data and performing a real time stream analysis according to one embodiment of the present invention.

FIG. 3 is a block diagram illustrating, at a high-level, functional components of a system 300 for performing feature engineering on time series data (e.g., machine data) and performing a real time stream analysis according to one embodiment of the present invention. The system 300 can include a device 305, a processing system 310, and databases 330.

As illustrated in this example, a set of device data streams (e.g., DStream) can be read by the processing system 310 from the device 305. The device 305 can be any device such as a manufacturing machine, a device on the IoT, or any other device that can generate a time series data.

A window operation 312 can be applied to each stream of data as it is read from the device data stream. This window operation 312 can, for example, segment the stream of data into windows based on, for example, time intervals or events. The windowed streams can then be mapped 314 to other windows of data from the same device stream. The mapped data can be contextualized 316 as described above with respect to FIG. 2. The mapped data can be contextualized 316 based on, for example, data from an enterprise resource planning database 336. The contextualized data can optionally be stored in, for example, a contextualized data database 332.

The contextualized data can be further segmented 320 into windows of data as described above with respect to FIG. 2. The segmenting 320 can be based on, for example, execution data from a manufacturing execution system database 338. Optionally, the contextualized data can be missing data points, which can be handled at 318.

The feature segmented/windowed data can be transformed 322 using SAX or some other time series transformation as described above with respect to FIG. 2. Optionally, the transformed data can be stored, for example in a transformed data database 334. As also described with respect to FIG. 2, the transformed data can be a summary of data such as a simple summary 324 or an advanced summary 326. The simple summary 324 and advanced summary 326 may be stored in summary database 340.

Figure 4:
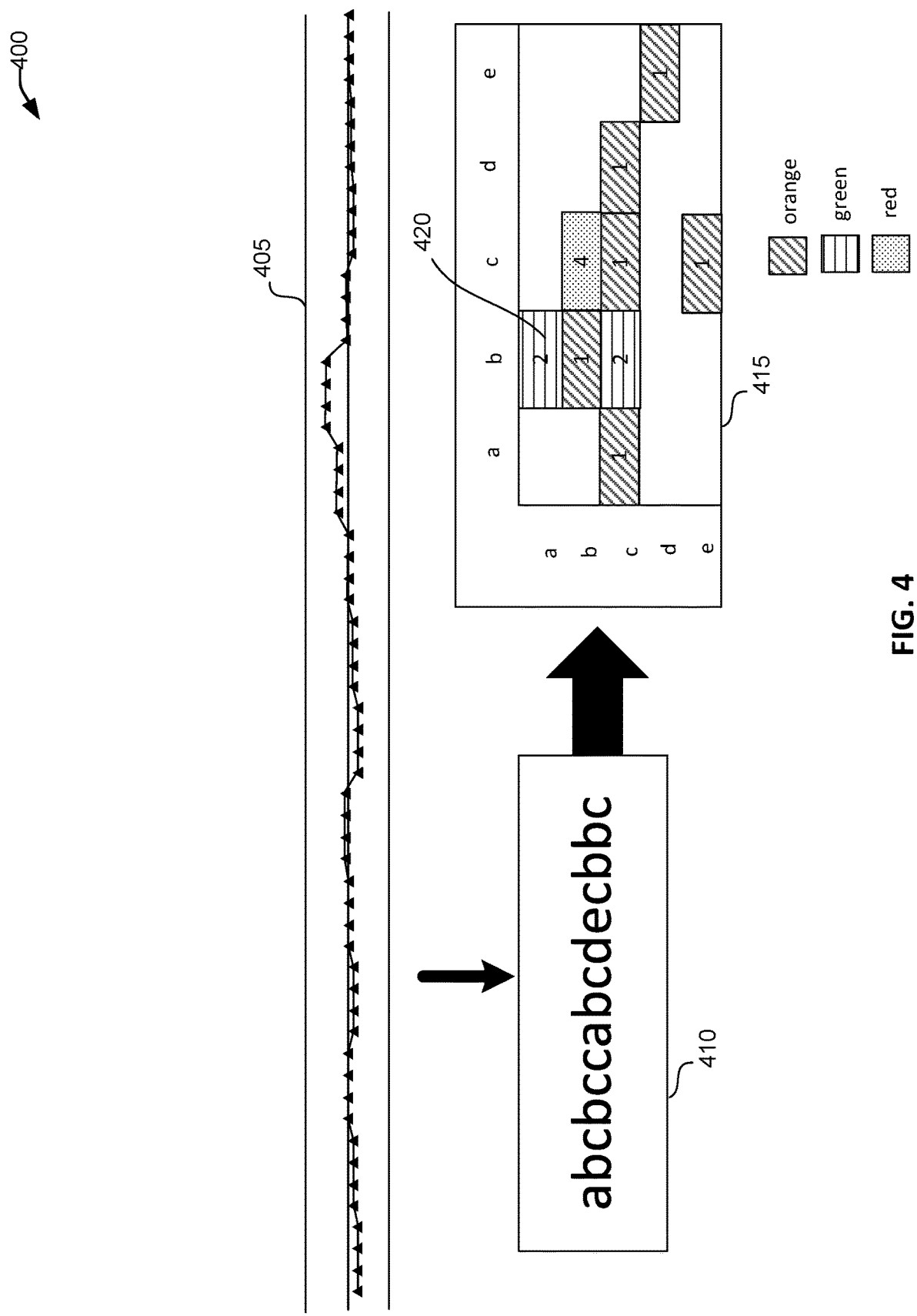
FIG. 4 is a diagram depicting generation of a genetic map from a transformed time series data.

FIG. 4 is a diagram 400 depicting generation of a genetic map from a transformed time series data. The data for transformation is shown at 405. For this example, SAX can be used for the transformation. The data as shown at 405 has already been normalized and the piecewise aggregate approximation has been performed. As shown, the data points can be converted to a SAX string 410. The process for conversion to a SAX string can include setting threshold values on the y-axis for bands. For example, band 1 can include values falling below −2 and can be assigned the character "a," band 2 can include values falling between −2 and −1 and can be assigned the character "b," band 3 can include values falling between −1 and 0 and can be assigned the character "c," band 4 can include values falling between 0 and 1 and can be assigned the character "d," band 5 can include values falling between 1 and 2 and can be assigned the character "e," and band 6 can include values falling above 2 and can be assigned the character "e." The result can be a string (e.g., string 410) representing the original time series. The string 410, can then be converted into a genetic map 415. The genetic map 415 can be created by, as shown for example, identifying within the string the number of transitions that match. For example, string 410 includes the transition "ab" twice, so the number two ("2") appears at the "ab" block 420. The remaining string transitions can be also mapped. Additionally, each number can be assigned a color for ease of visual analysis and each block containing the number can be filled with the color. For example, the number one ("1") can be orange, the number two ("2") can be green, and the number four ("4") can be red.

Figure 5A:
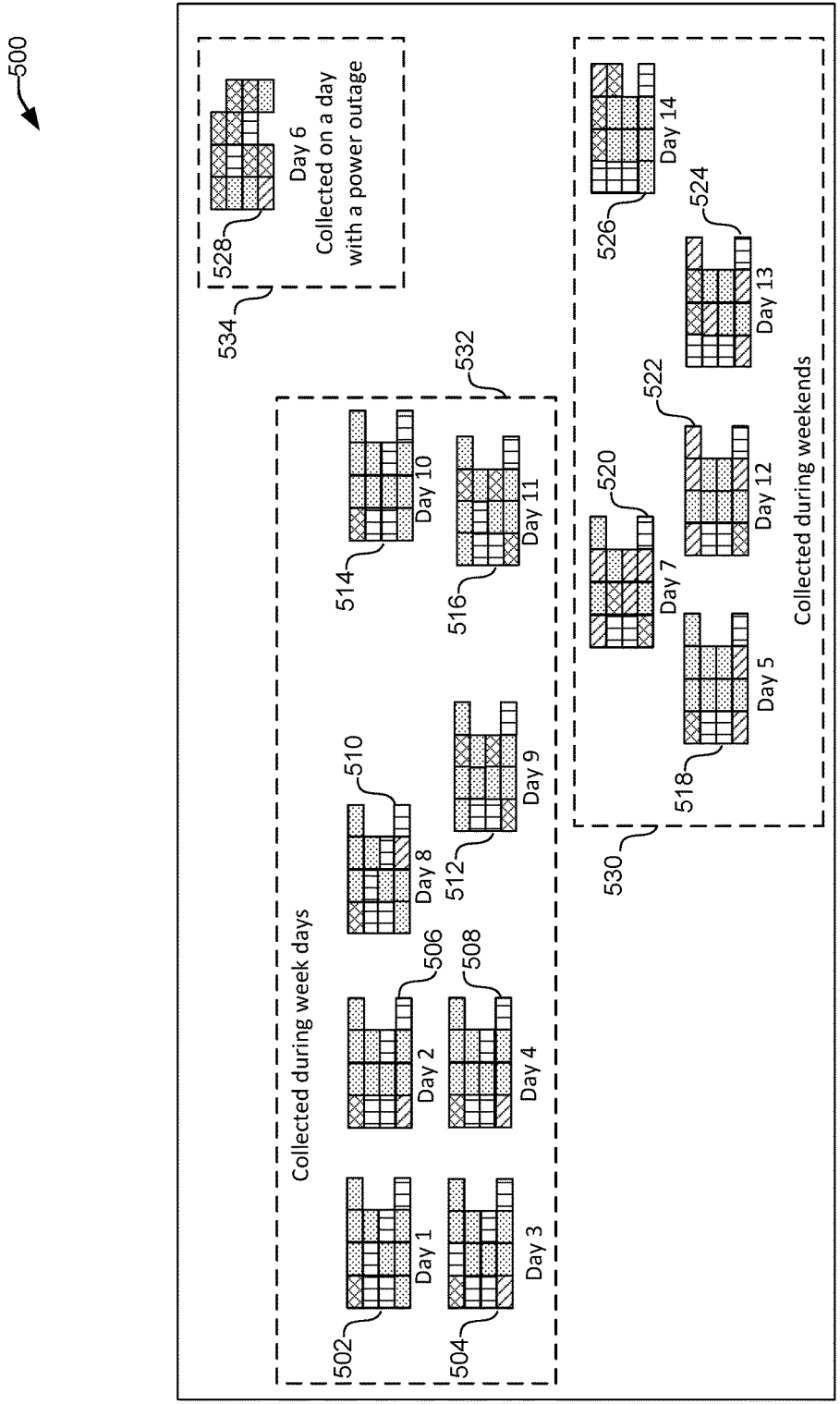
FIG. 5A depicts clustering and grouping genetic maps of windows of data from a time series data.

FIG. 5A depicts the clustering and grouping 500 of genetic maps of windows of data from a time series data. As an example, a time series of data can be collected from a device for a period of time spanning two weeks. Note that any duration of time can be collected. For example the time span can be a day, a week, a month, a year, or any other time period. Returning to the example, the two week time series of data can be contextualized by, for example, product, as described above with respect to FIG. 2. At least one result of the contextualized data will include a time series of data spanning two weeks for a specific product. That time series data for the product spanning two weeks can then be segmented into days as described above with respect to FIG. 2. The result can be fourteen (14) time series data sets for the product, each time series data set spanning one day/24 hour period. Each of the fourteen time series data sets can be transformed and a genetic map created for each one. Each of the genetic maps 502, 504, 506, 508, 510, 512, 514, 516, 518, 520, 522, 524, 526, and 528 can be one of the genetic maps created of the time series data for the product for a specific day.

The genetic maps can be grouped based on a similarity in pattern, as shown in FIG. 5A. As an example, grouping 532 contains genetic map 502, 504, 506, 508, 510, 512, 514 and 516. Each of the genetic maps grouped into grouping 532 are based on data captured during week days (Monday through Thursday), as noted. Grouping 530 contains genetic maps 518, 520, 522, 524, and 526. Each of the genetic maps grouped into grouping 530 are based on data captured during weekends (Friday through Sunday), as noted. Only one outlier 528 is contained in grouping 534. Genetic map 528 is based on data captured during a day in which the facility experienced a power outage, as noted in FIG. 5A. This outlier 528 can be explained for that reason, for example.

The clustering and grouping 500 shown in FIG. 5A can be displayed to a user for visual analysis. Such a visual analysis can allow a user to quickly see that Day 6 may have had poor product quality since the genetic map 528 for Day 6 is an outlier. The visual analysis can allow the user to quickly see that the performance and product quality for the week days appears to be consistent based on grouping 532 containing genetic maps 502, 504, 506, 508, 510, 512, 514, and 516. Similarly, the visual analysis can allow the user to quickly see that the performance and product quality for the weekends appears to be consistent based on grouping 530.

Figure 5B:
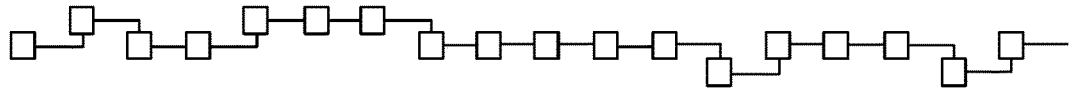
FIG. 5B depicts another view of clustering and grouping genetic maps of windows of data from a time series data.
Figure 5B:
Figure 5B:
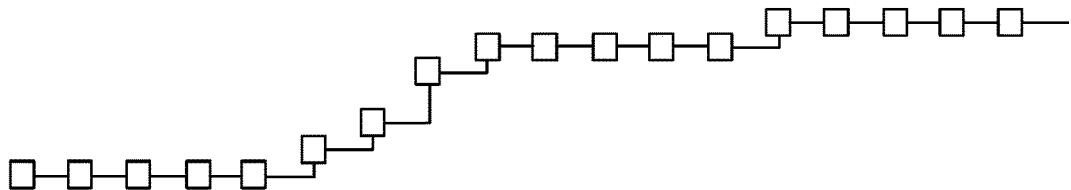
Figure 5B:
Figure 5B:
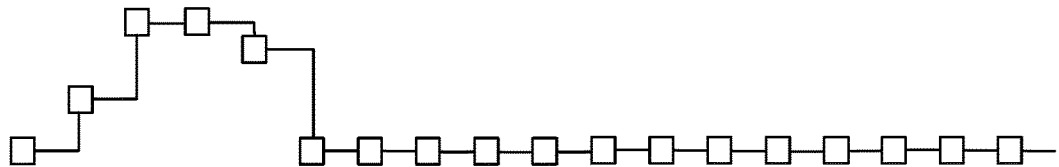
Figure 5B:

FIG. 5B depicts the clustering and grouping 550 of genetic maps of windows of data from a time series data. Similar to the time series depicted in FIG. 5A, the time series data collected for the clustering in FIG. 5B can be collected over a defined period of time. The time series of data can be contextualized by, for example, work order. At least one result of the contextualized data will include a time series of data including all data from the specified work order. That time series data for the work order can then be segmented or windowed as described above. The result can be multiple data sets, one for each segment. Each of the segments can be transformed and a genetic map created for each one.

The genetic maps can then be clustered as shown in FIG. 5B. Cluster-0 can represent a flat pattern. Cluster-1 can represent an increasing pattern. Cluster-2 can represent a pattern where there is a short burst for a short period and then remains flat. For example, in the steel industry, Cluster-2 may result from a pattern that emerges when oxygen is blown into the converter at the beginning of the process. Cluster-0 and Cluster-1 can result from a pattern that emerges when oxygen is blown incorrectly causing different quality of yield issues in the batch.

Figure 6:
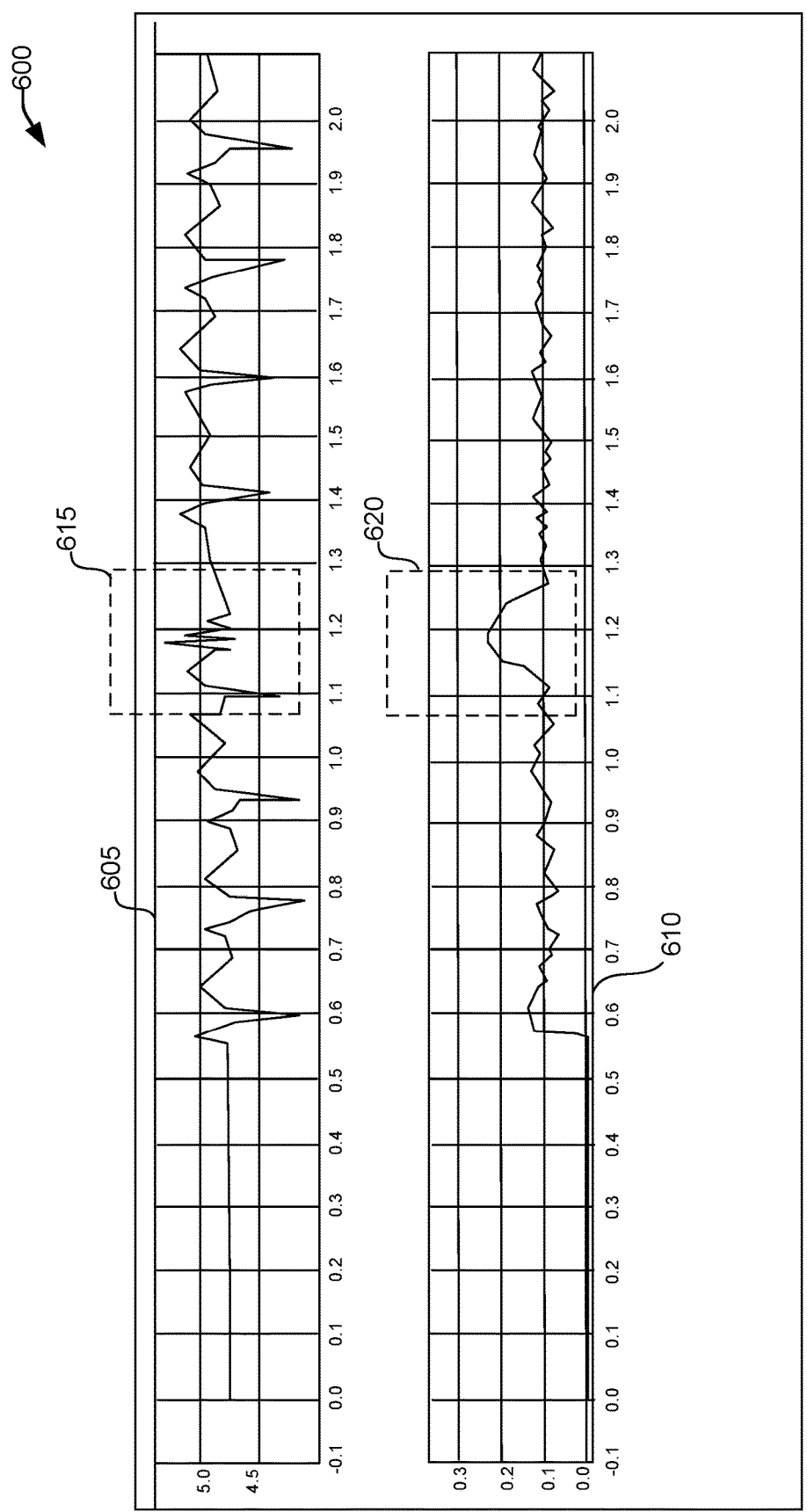
FIG. 6 illustrates a user interface showing a detected anomaly in a time series data.

FIG. 6 illustrates a user interface 600 showing a detected anomaly in a time series data. Anomaly detection can be done automatically by the processing system upon receiving the time series data. Once the time series data is contextualized and segmented/windowed, the time series transformation (e.g., SAX transformation) can be performed so that the resulting data is more easily manipulated and/or viewed for analysis. The transformed data can result, for example, in a SAX string. The processing system can, optionally, automatically perform analysis of the string to detect, for example, transitions spanning more than two bands. For example, a search of the string for "ad," "da," "be," or "eb" can indicate an anomaly.

As shown in FIG. 6, the original time series data 605 can be normalized and smoothed to generate graph 610. The time series data 605 can further be transformed and genetic maps 615 and 620 can be generated for at least portions of the time series data 605. The user interface 600 can show the anomaly in the original time series 605, as shown at 615. In the normalized and smoothed data 610 the anomaly also clearly appears at 620 for easy visual detection by the user.

Figure 7:
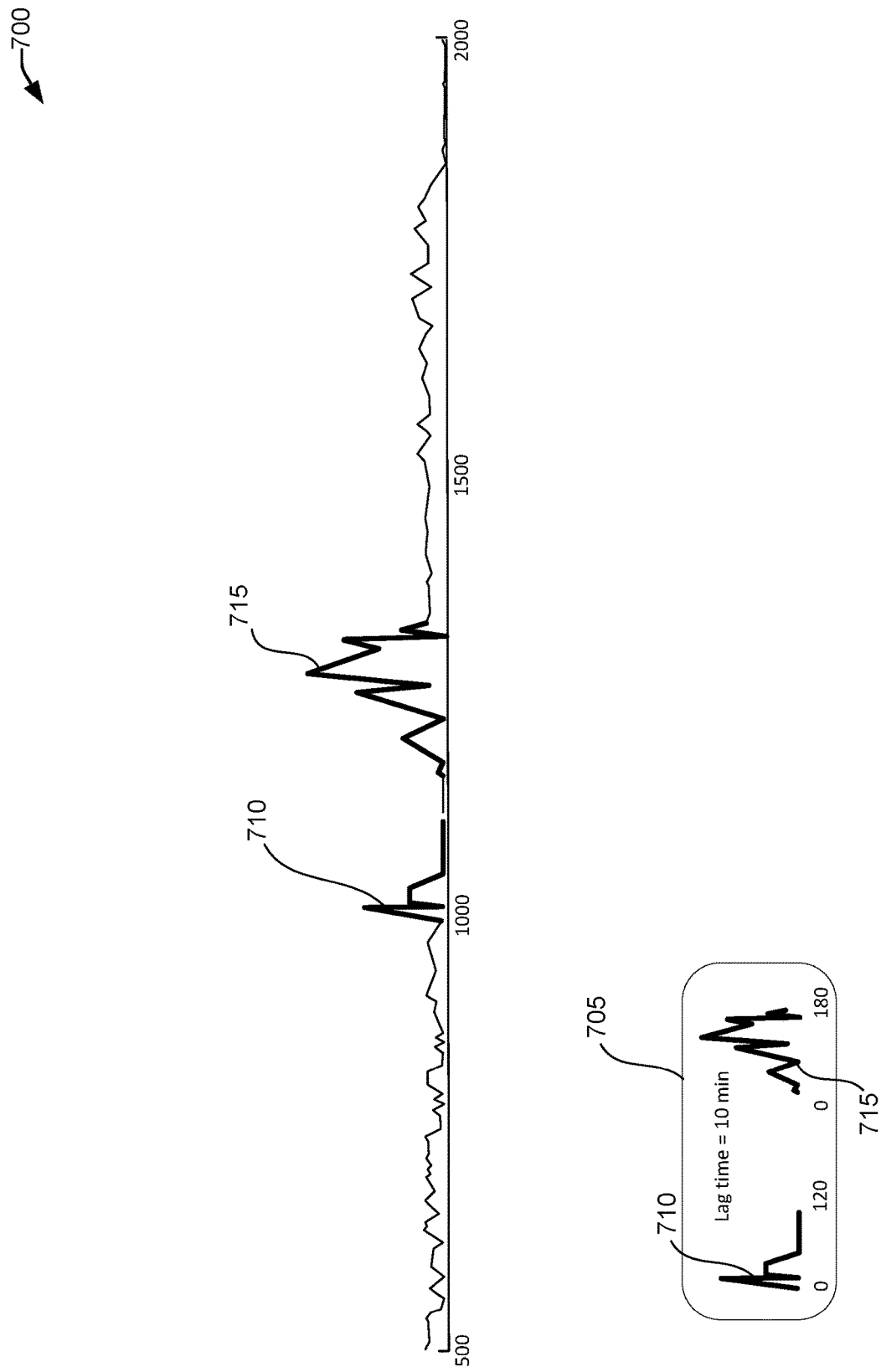
FIG. 7 illustrates an example of pattern detection from a time series data.

FIG. 7 illustrates an example of pattern detection 700 from a time series of data. Optionally, machine learning can be used to identify patterns that appear consistently within time series data to identify patterns. Once the time series data has been contextualized, segmented/windowed, and transformed as described above with respect to FIG. 2, machine learning can be performed on the SAX string or other summarized data. Such machine learning can include identifying patterns that appear more than a threshold number of times, for example.

As shown in FIG. 7, the pattern 705 can be a known anomaly. For example, once pattern 705 has been identified more than a threshold number of times, it can become a pattern for which the processing system can search and identify automatically. The pattern 705 may include detecting pattern 710, for example, 10 minutes prior to pattern 715. The pattern 705 may indicate an anomaly that suggests that the products produced during pattern 715 may have poor quality, for example. In such a case, when the pattern 710 is identified, the processing system can, for example, send an alert to a technician that the pattern 710 was detected, indicating that in 10 minutes pattern 715 will occur based on known pattern 705.

Figure 8:
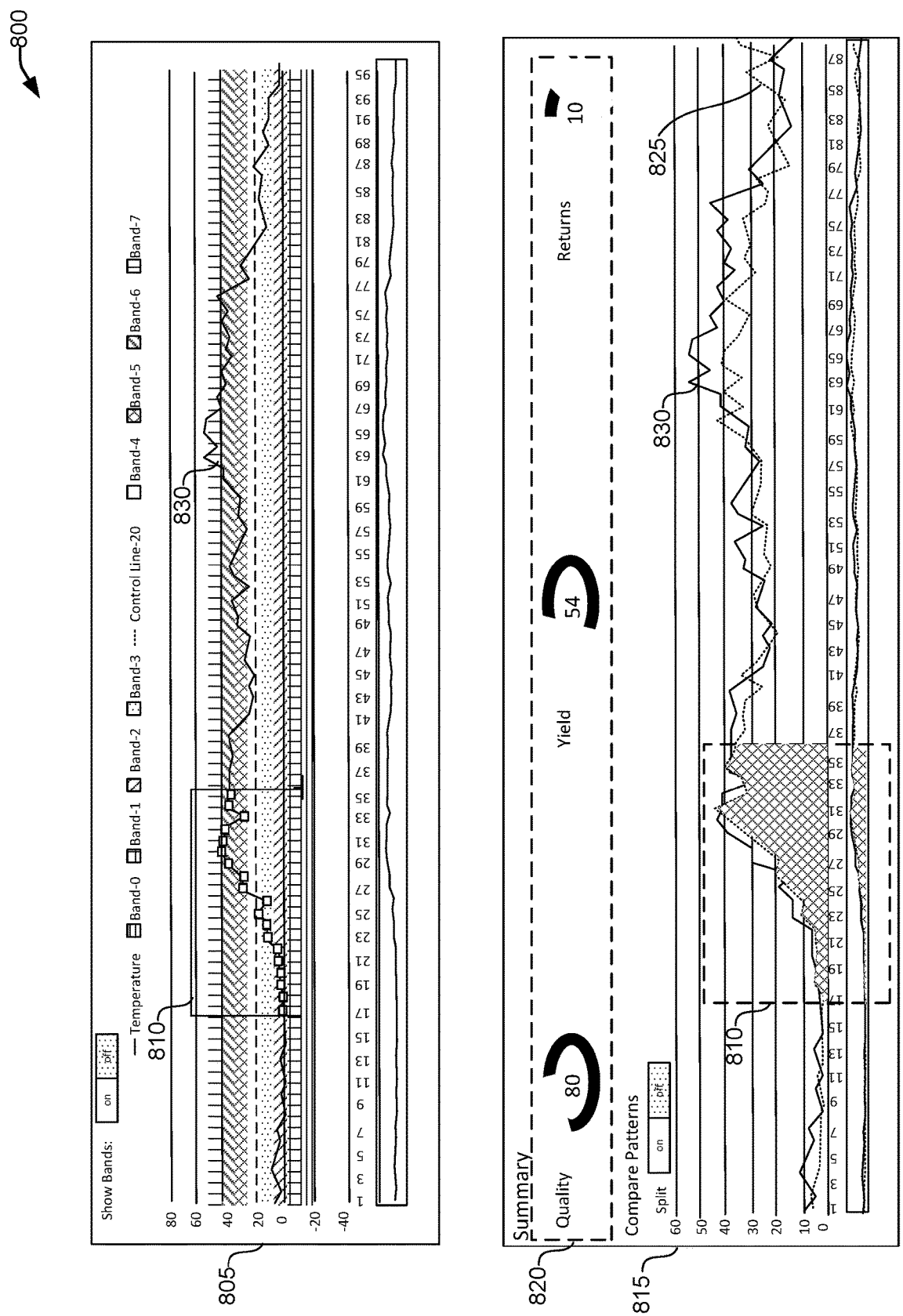
FIG. 8 is an exemplary user interface for providing results of feature engineering on time series data and performing a user custom query according to an embodiment.

FIG. 8 is an exemplary user interface 800 for providing results of feature engineering time series or machine data and performing a user custom query according to one embodiment of the present invention. As illustrated in this example, the feature engineered time series data 830 can be presented in a graph 805. From this graph 805, a user can select a region of interest 810. Based on this selection, a query can be performed for data within or matching the selected region 810. The matching data can be presented along with ERP context information 820 via a matching data graph 815. As shown in FIG. 8, the graph 815 can include the matching data 825 superimposed over the feature engineered time series data 830. The region of interest 810 can be highlighted or otherwise indicated on the matching data graph 815.

Figure 9:
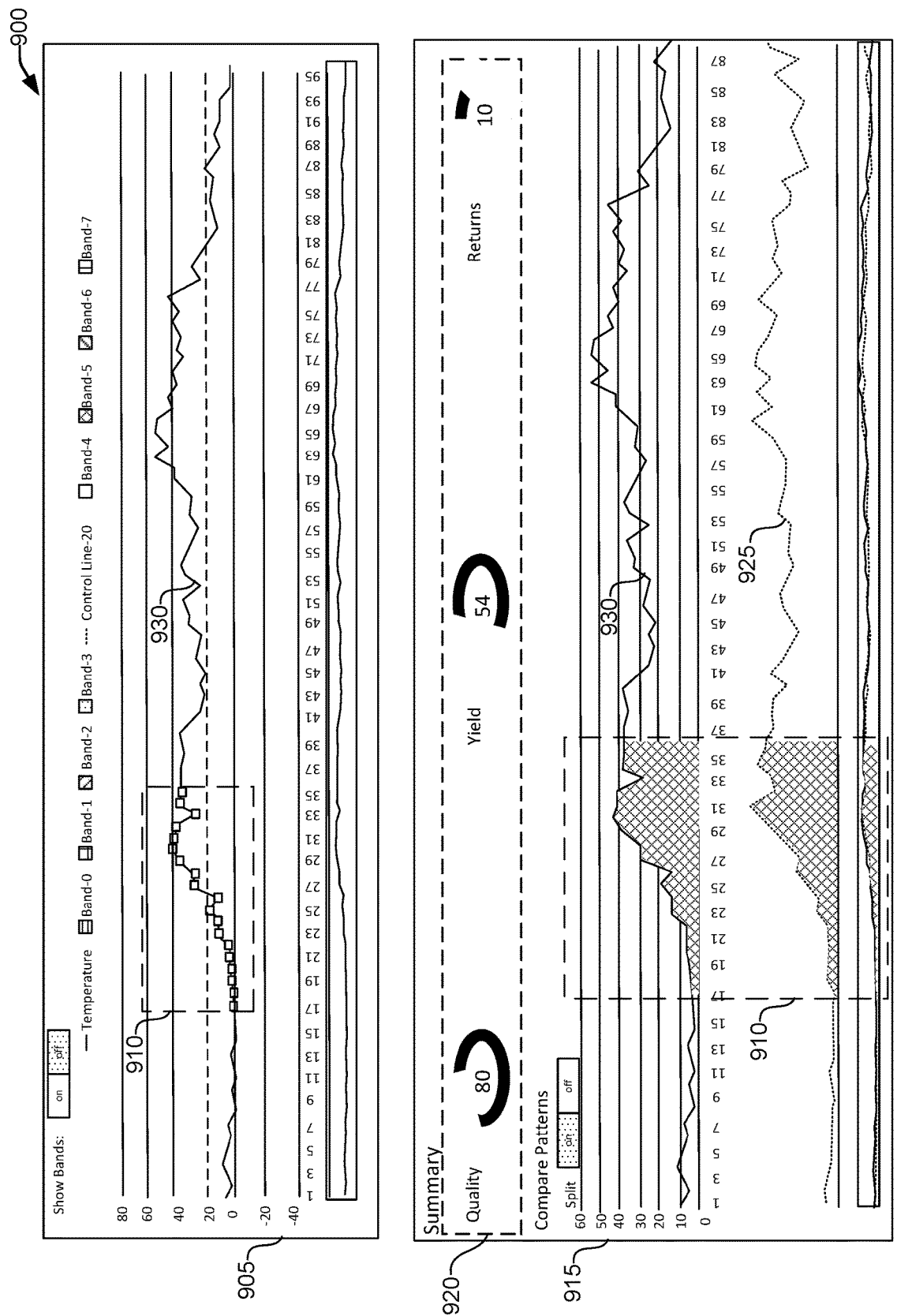
FIG. 9 is another exemplary user interface for providing results of feature engineering time series data and performing a user custom query.

FIG. 9 is another exemplary user interface 900 for providing results of feature engineering time series data and performing a user custom query. The feature engineered time series data 930 can be presented in graph 905 as described in FIG. 8, and the user can select a region of interest 910. Based on this selection, a query can be performed for data within or matching the selected region 910. The matching data can be presented along with ERP context information 920 via a matching data graph 915. Note that the distinction between matching graph 915 and matching graph 815 of FIG. 8 is that the matching data 925 is shown in a graph below the feature engineered time series data 930 instead of superimposed. Such a configuration difference can be configured through the user interface of the system.

Figure 10:
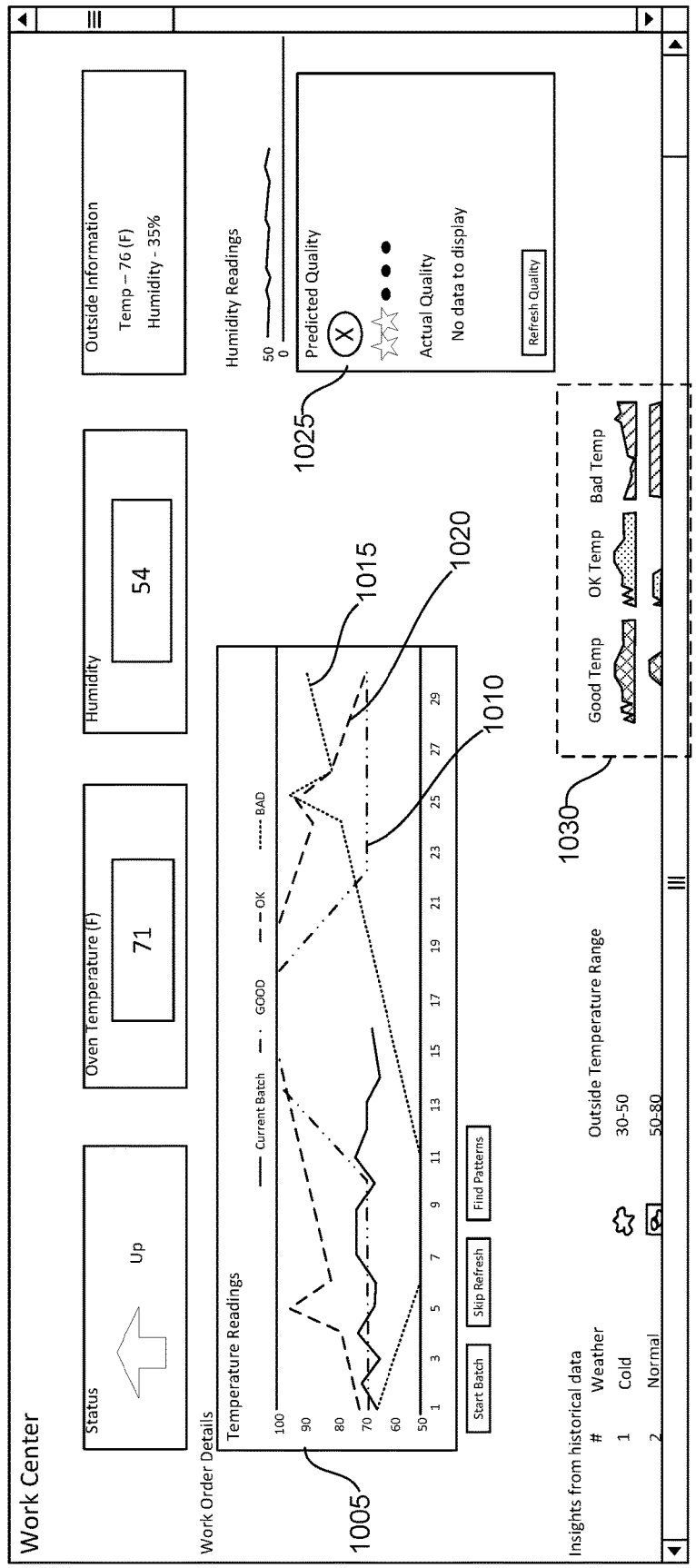
FIG. 10 is an exemplary user interface for providing results of feature engineering time series data and providing a prediction of product quality using a time series cluster according to one embodiment of the present invention.

FIG. 10 is an exemplary user interface 1000 for providing results of feature engineering time series or machine data and providing a prediction of product quality using a time series cluster according to one embodiment of the present invention. As illustrated in this example, the feature engineered time series or machine data can be presented in a graph 1005 in which the data is clustered into "good" 1010, "bad" 1015, or "ok" 1020 regions based on a set of parameters for the data. The clustered data can be displayed as different lines on the graph 1005, as shown. The clustered data can also be used as a basis of a prediction 1025 of product quality or other metric which can also be presented in the user interface 1000. Additionally or alternatively, a set of one or more historical time series patterns for the data can be presented, as shown at 1030.

Figure 11:
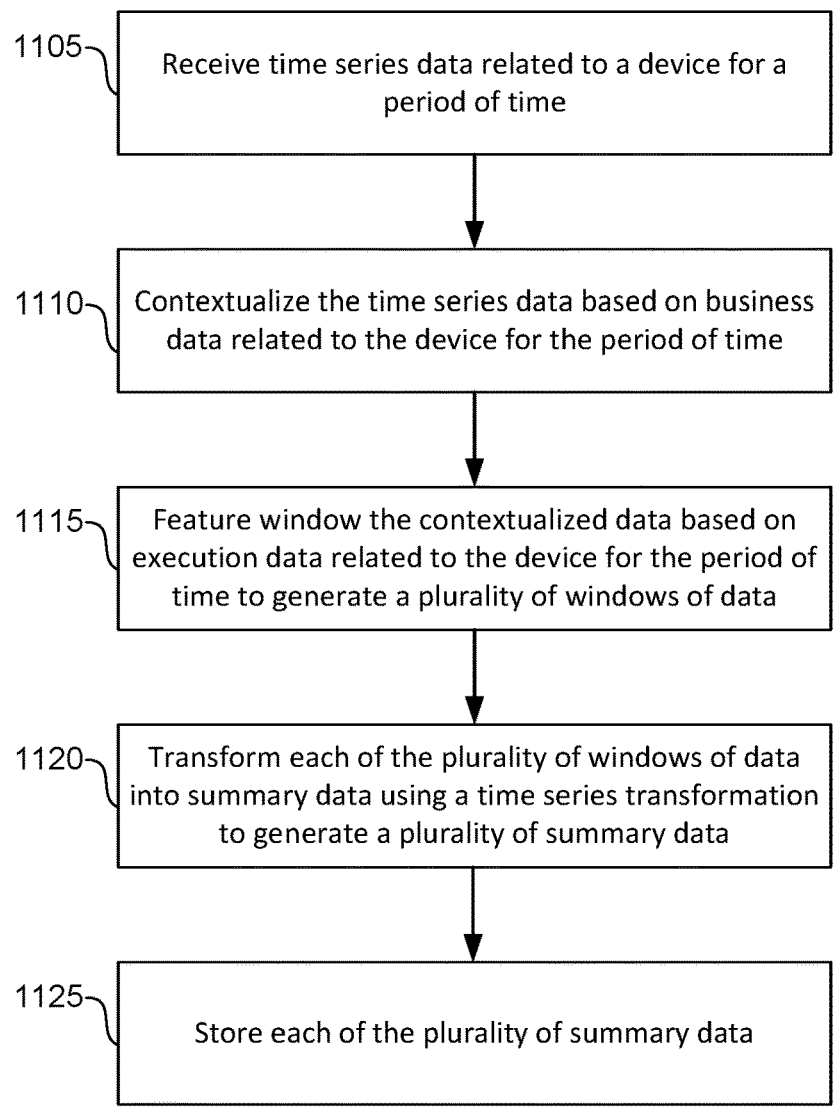
FIG. 11 is a flow diagram of a method for performing feature engineering according to an embodiment.

FIG. 11 is a flow diagram of a method 1100 for performing feature engineering according to an embodiment of the present invention. The method 1100 can be performed by, for example, a computer system, such as computer system 1800 of FIG. 18 or processing system 210 of FIG. 2. The method 1100 can begin at 1105 when the computer system receives time series data related to a device for a period of time. The device can be any device from which time series data can be generated, as discussed with respect to FIG. 2. For example, the device can be an IoT device, a machine on a manufacturing plant floor, or any other machine. The period of time can be any period of time, for example, a twenty-four hour period, a month period, or a year period. The time series data can be obtained from a historical data database such as raw database 242 of FIG. 2. Optionally, time series data can be obtained from a data stream such as described in FIG. 3.

At 1110, the processor can contextualize the time series data based on business data related to the device for the period of time. As described with respect to FIGS. 2 and 3, the business data can be from an enterprise resource planning database. The time series data, as described with respect to FIG. 1, can be contextualized based on a variable associated with the business data, such as by product, by lot, by user/technician, or any other suitable variable. The business data can be business data about or related to the device for which the time series data applies. For example, the device can be a furnace used for manufacturing a product. The business data may include, for example, schedule information for the furnace, including product name and type, for products manufactured using the furnace. The business data can also include, for example, times for which the products were being processed by the furnace, the name of the operator (i.e., user, operator) of the furnace, and the times for which the operator was operating the furnace. The business data can include any information about the device (e.g., furnace) concerning what is happening with the device at specific times. That information can be combined with the time series data to segment the time series data based on one or more of the variables or features (e.g., technician, product, lot).

At 1115, the processor can further window, or segment, the contextualized time series data based on execution data related to the device for the period of time to generate a plurality of windows of data. The contextualized data is data that has been segmented based on a feature. This data can be feature windowed or segmented based on execution data. As discussed with respect to FIGS. 2 and 3, the execution data can be from a manufacturing execution system database. The execution data can include information such as details regarding the manufacturing of a product made by the device. For example, the device can be a furnace used for manufacturing products and the execution data can include information about the processing of the products including when the furnace was warming up, processing a specific product, various steps within the processing of the specific product (e.g., melting, curing, various phases of, for example, curing, and so forth), cooling down, and any other relevant execution step for manufacturing products. The windows of data can be based on, for example, an event triggered by the known steps from the execution information. Optionally, the windows of data can be based on an interval of time, a sliding window of time, or autowindowing. Autowindowing can be performed automatically by the processing system and can include, for example, determining which type of windowing to perform (e.g., based on event, based on interval of time, sliding window) and/or an interval of time for which to segment (i.e., window) the contextualized data.

At 1120, the processor can transform each of the plurality of windows of data into summary data using a time series transformation to generate a plurality of summary data. The time series transformation can be any suitable time series transformation including, for example, SAX transformation, moving averages, discrete wavelet transform, and fast Fourier transform. As described with respect to FIG. 2, the summary data can be simple summary data or advanced summary data.

At 1125, the processor can store each of the plurality of summary data. For example, the summary data can be stored in a summary data database such as summary data database 230 of FIG. 2.

Figure 12:
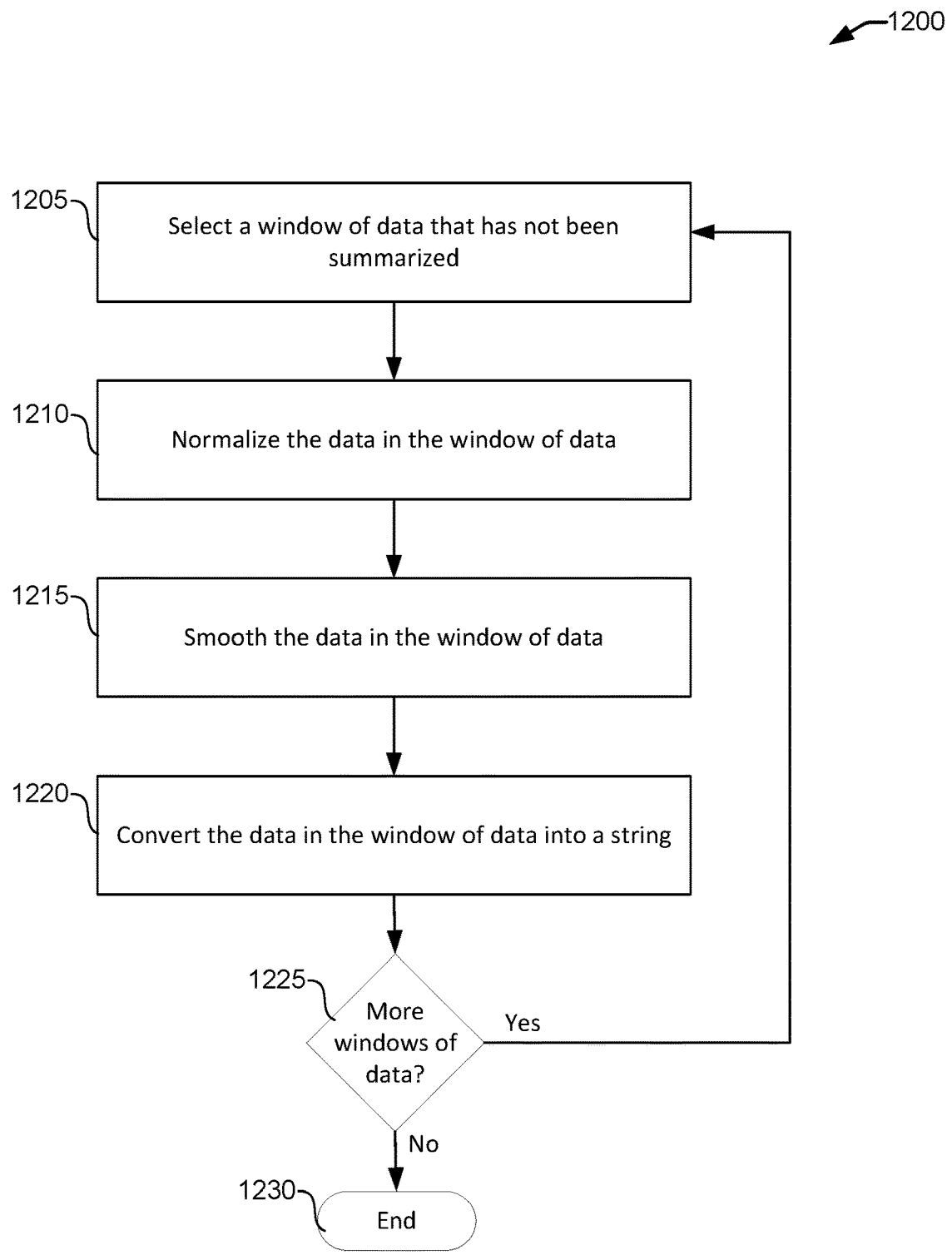
FIG. 12 is a flow diagram of another method for performing feature engineering according to an embodiment.

FIG. 12 is a flow diagram of another method 1200 for performing feature engineering. The method 1200 can be performed by, for example, a computer system, such as computer system 1800 of FIG. 18 or processing system 210 of FIG. 2. The method 1200 can be the steps performed for transforming data used at 1120 of FIG. 11. The method 1200 can begin at 1205 when the processor selects a window of data from the feature windowed data to be summarized. The window of data can be any window of data that needs to be summarized but has not yet been summarized. The window of data can be selected from any of the feature windowed data sets generated at, for example, 1115 of FIG. 11.

At 1210, the processor can normalize the data in the window of data. A z-normalization can be used, for example. Once the window of data is normalized, the normalized data can be stored in, for example, a database or stored more temporarily in, for example, random access memory ("RAM").

At 1215, the processor can smooth the normalized data. Any suitable smoothing algorithm can be used such as, for example, piecewise aggregate approximation. Once the normalized data has been smoothed, it can be stored in, for example, a database, or more temporarily, for example, in RAM.

At 1220, the processor can convert the smoothed data from the window of data into a string. Alternatively, the processor can convert the smoothed data from the window of data into any suitable summary data. SAX transformations convert the smoothed data into a string, which is a useful summary form for the purposes of analysis, searching, machine learning, and so forth.

At 1225, the processor can determine whether there are remaining windows of data that have not yet been summarized. If there are more remaining windows of data, the processor can return to 1205 and select another window of data for summarization. If there are no more remaining windows of data to be summarized, the method can end at 1230 and, for example, return to 1125 of FIG. 11 to complete storage of the summarized data.

Figure 13:
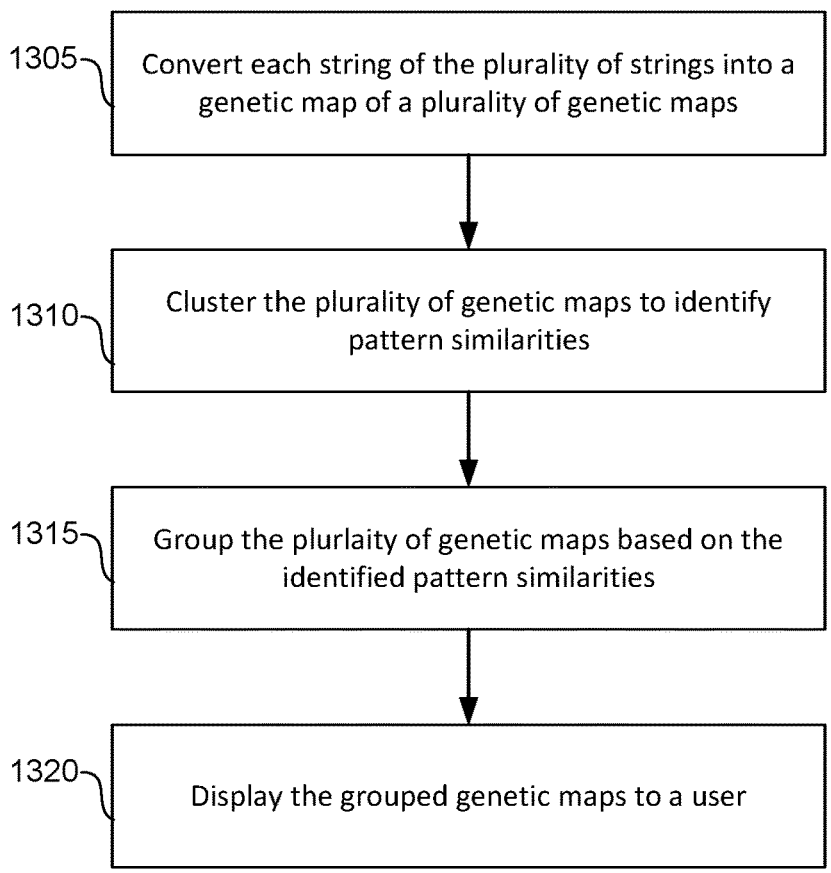
FIG. 13 is a flow diagram of yet another method for performing feature engineering according to an embodiment.

FIG. 13 is a flow diagram of yet another method 1300 for performing feature engineering. The method 1300 can be performed by, for example, a computer system, such as computer system 1800 of FIG. 18 or processing system 210 of FIG. 2. The method 1300 can be performed in conjunction with or following the method 1100 of FIG. 11, which may or may not include the method 1200 of FIG. 12. The method 1300 can begin at 1305 when the processor can convert each string of the plurality of strings generated as summary data of the time series data into a genetic map of a plurality of genetic maps. Once the time series data has been contextualized and feature windowed, there are multiple sets of windowed data. Each of the windowed data sets can be transformed into, for example, a string, as was described with respect to FIG. 11. Following that process, there are multiple summary strings of data representing portions of the original time series data. Each of those summary strings of data can be converted into a genetic map, as described in more detail with respect to FIG. 4.

At 1310, the processor can cluster the genetic maps to identify pattern similarities. The clustering process can be, for example, performed by searching the genetic maps for pattern similarities based on, for example, transition patterns and character matching in the summary data string.

At 1315, the processor can group the genetic maps based on the identified pattern similarities. For example, a specific number (e.g., 3) of groupings can be formed and the genetic maps can be put into one of the groupings based on the similarities of the patterns. Optionally, the number of pattern similarities can be determined and the number of groupings can be based on that determined number. Examples of grouping is discussed with respect to FIGS. 5A and 5B.

At 1320, the processor can display the grouped genetic maps to a user using a user interface, such as user interface 205 of FIG. 2. The groupings can allow the user to visually analyze the processed data. Examples of a displayed grouping of genetic maps is discussed at FIGS. 5A and 5B.

Figure 14:
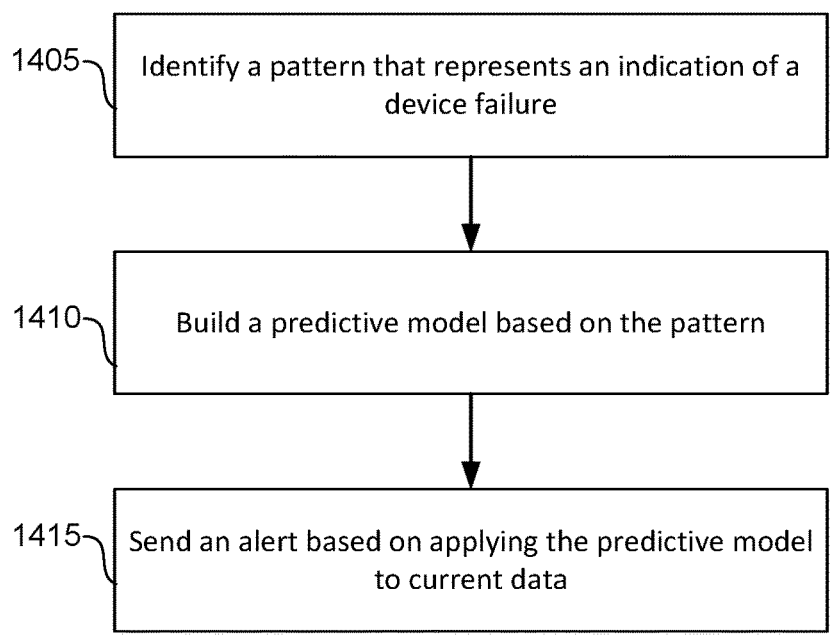
FIG. 14 is a flow diagram of still another method for performing feature engineering according to an embodiment.

FIG. 14 is a flow diagram of still another method 1400 for performing feature engineering. The method 1400 can be performed by, for example, a computer system, such as computer system 1800 of FIG. 18 or processing system 210 of FIG. 2. The method 1400 can be performed in conjunction with or following the method 1100 of FIG. 11, which may or may not include the methods 1200 of FIG. 12 and/or 1300 of FIG. 13. The method 1400 can begin at 1405 when the processor can identify a pattern that represents an indication of a device failure. For example, the processor can identify, based on generation of the summary data, using a string search, a string that represents a jump in two or more bands, such as discussed with respect to FIG. 6. As another example, as described with respect to FIG. 7, the processor can identify, based on the summary data, using pattern detection, a pattern that indicates a failure, for example.

At 1410, the processor can build a predictive model based on the pattern. Once the pattern is a known pattern that represents a failure, a predictive model can be developed based on the pattern, as described with respect to FIG. 7.

At 1415, the processor can send an alert based on applying the predictive model to current data. For example, when streamed data is processed and analyzed as described with respect to FIG. 3, the predictive model can be applied to the streamed data. If the pattern contained in the predictive model is identified in the stream of data, the processor can send an alert to, for example, a user, a technician, an operator, or any other suitable recipient. The alert can be sent via, for example, text message, email, pager, or any other suitable notification method.

Figure 15:
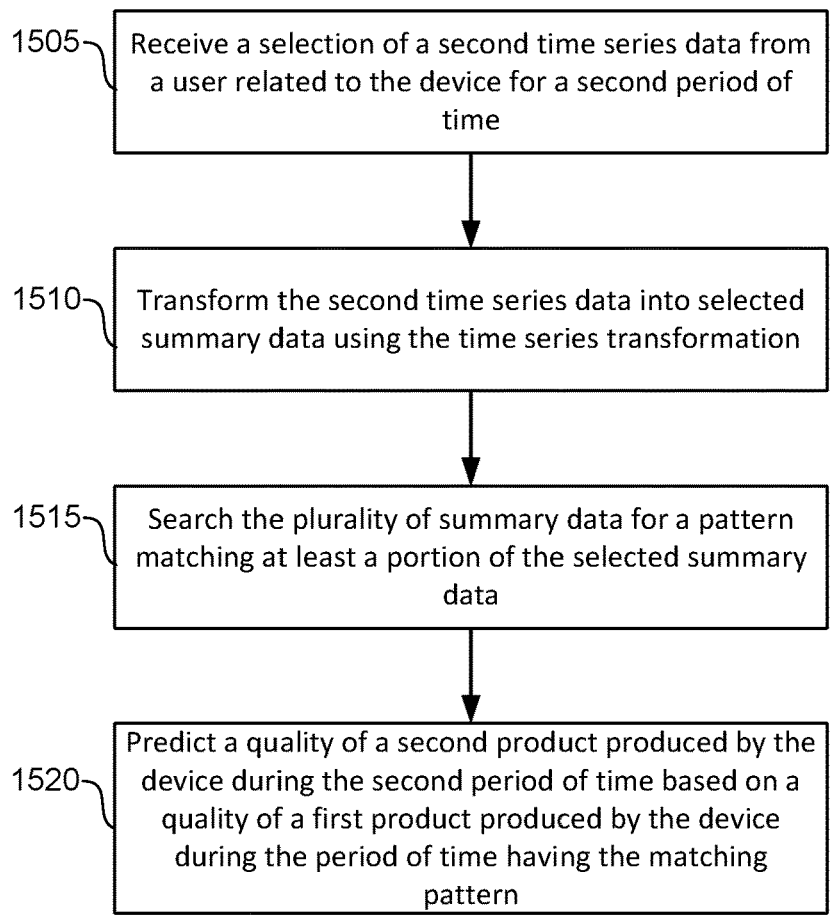
FIG. 15 is a flow diagram of yet another method for performing feature engineering according to an embodiment.

FIG. 15 is a flow diagram of yet another method 1500 for performing feature engineering. The method 1500 can be performed by, for example, a computer system, such as computer system 1800 of FIG. 18 or processing system 210 of FIG. 2. The method 1500 can be performed in conjunction with or following the method 1100 of FIG. 11, which may or may not include the methods 1200 of FIG. 12 and/or 1300 of FIG. 13 and/or 1400 of FIG. 14. The method 1500 can begin at 1505 when the processor can receive a selection of a second time series of data from a user. The second time series of data can be from the same device as the first time series of data but for a second period of time. The selection can be, for example, selection of a portion of a graph via a user interface as described with respect to FIGS. 8 and 9.

At 1510, the processor can transform the second time series of data into summary data using the time series transformation that was used on the first time series of data. For example, SAX transformation can be performed on the second time series of data. Contextualization and feature windowing of the selection of data may or may not be performed prior to the transformation.

At 1515, the processor can search the summary data generated from the first time series of data for a pattern matching the selection of the second time series of data. The searching can be done based on the summary data being, for example, a string, so a string search can be performed. Any suitable matching algorithm can be used.

At 1520, the processor can predict a quality of a second product produced by the device during the second period of time. The prediction can be based on the quality of a first product produced by the device during the period of time having the matching pattern. In other words, when a matching pattern is found in an existing time series of data, the quality of the product produced during the period of time when the pattern exists can provide an indication or prediction of the quality of the product produced during the selected second period of time. Additionally, pattern matches with consistent associated product quality can increase the confidence of the prediction.

Figure 16:
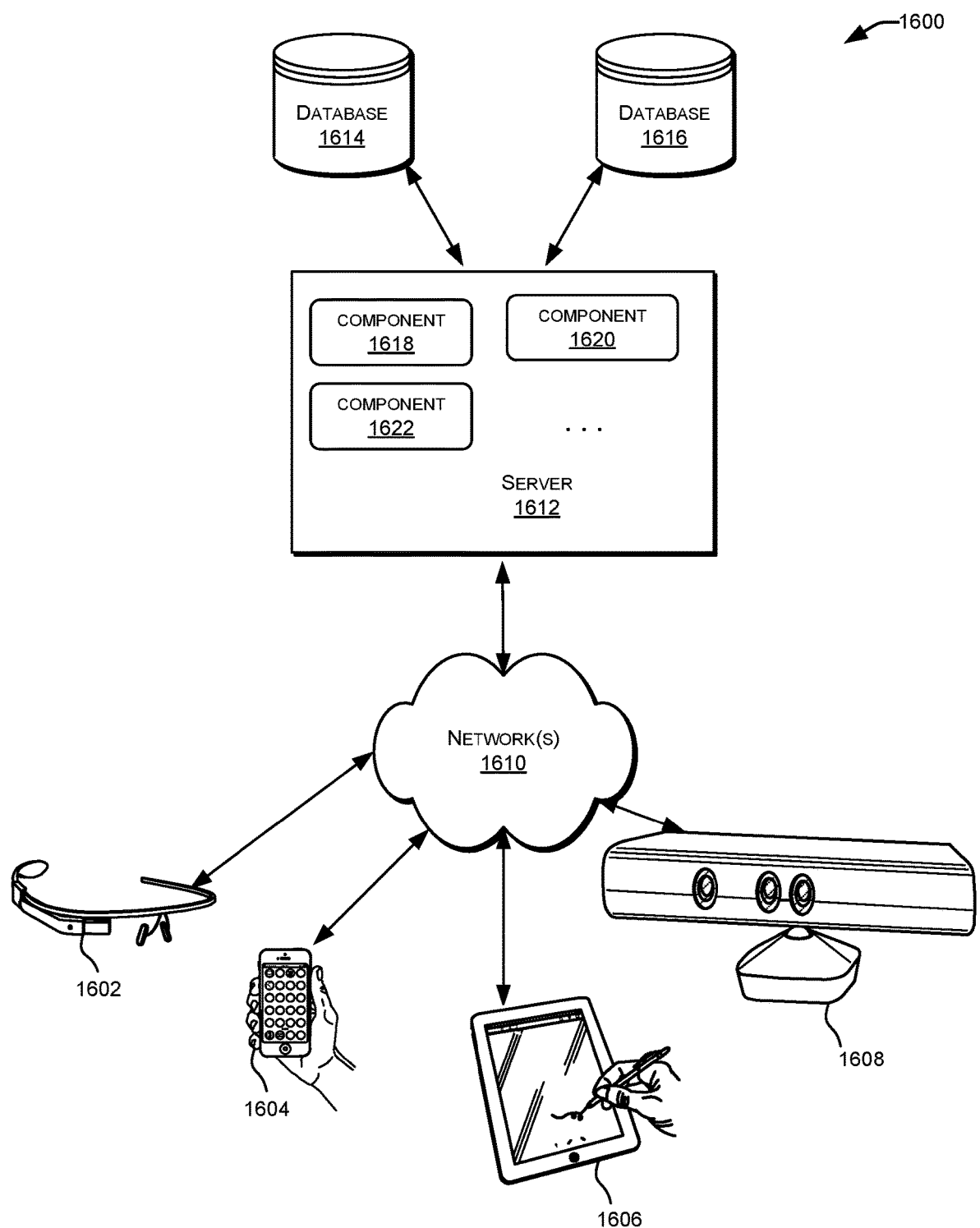
FIG. 16 is a block diagram illustrating components of an exemplary distributed system in which various embodiments of the present invention may be implemented.

FIG. 16 is a block diagram illustrating components of an exemplary distributed system in which various embodiments of the present invention may be implemented. In the illustrated embodiment, distributed system 1600 includes one or more client computing devices 1602, 1604, 1606, and 1608, which are configured to execute and operate a client application such as a web browser, proprietary client (e.g., ORACLE® Forms), or the like over one or more network(s) 1610. Server 1612 may be communicatively coupled with remote client computing devices 1602, 1604, 1606, and 1608 via network 1610.

In various embodiments, server 1612 may be adapted to run one or more services or software applications provided by one or more of the components of the system. In some embodiments, these services may be offered as web-based or cloud services or under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in the figure, the software components 1618, 1620 and 1622 of system 1600 are shown as being implemented on server 1612. In other embodiments, one or more of the components of system 1600 and/or the services provided by these components may also be implemented by one or more of the client computing devices 1602, 1604, 1606, and/or 1608. Users operating the client computing devices may then utilize one or more client applications to use the services provided by these components. These components may be implemented in hardware, firmware, software, or combinations thereof. It should be appreciated that various different system configurations are possible, which may be different from distributed system 1600. The embodiment shown in the figure is thus one example of a distributed system for implementing an embodiment system and is not intended to be limiting.

Client computing devices 1602, 1604, 1606, and/or 1608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as IOS®, WINDOWS® phone, ANDROID®, BLACKBERRY® 10, PALM OS®, and the like, and being Internet, e-mail, short message service (SMS), BLACKBERRY®, or other communication protocol enabled. The client computing devices can be general purpose personal computers including, by way of example, personal computers and/or laptop computers running various versions of MICROSOFT WINDOWS®, APPLE MACINTOSH®, and/or LINUX® operating systems. The client computing devices can be workstation computers running any of a variety of commercially-available UNIX® or UNIX-like operating systems, including without limitation the variety of GNU/LINUX® operating systems, such as for example, GOOGLE CHROME® OS. Alternatively, or in addition, client computing devices 1602, 1604, 1606, and 1608 may be any other electronic device, such as a thin-client computer, an Internet-enabled gaming system (e.g., a MICROSOFT XBOX® gaming console with or without a Kinect® gesture input device), and/or a personal messaging device, capable of communicating over network(s) 1610.

Although exemplary distributed system 1600 is shown with four client computing devices, any number of client computing devices may be supported. Other devices, such as devices with sensors, etc., may interact with server 1612.

Network(s) 1610 in distributed system 1600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), APPLETALK®, and the like. Merely by way of example, network(s) 1610 can be a local area network (LAN), such as one based on Ethernet, Token-Ring and/or the like. Network(s) 1610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE®) 802.11 suite of protocols, Bluetooth®, and/or any other wireless protocol); and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1612 may be adapted to run one or more services or software applications described in the foregoing disclosure. For example, server 1612 may correspond to a server for performing processing described above according to an embodiment of the present disclosure.

Server 1612 may run an operating system including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from ORACLE®, MICROSOFT®, SYBASE®, IBM® (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more databases 1614 and 1616. Databases 1614 and 1616 may reside in a variety of locations. By way of example, one or more of databases 1614 and 1616 may reside on a non-transitory storage medium local to (and/or resident in) server 1612. Alternatively, databases 1614 and 1616 may be remote from server 1612 and in communication with server 1612 via a network-based or dedicated connection. In one set of embodiments, databases 1614 and 1616 may reside in a storage-area network (SAN). Similarly, any necessary files for performing the functions attributed to server 1612 may be stored locally on server 1612 and/or remotely, as appropriate. In one set of embodiments, databases 1614 and 1616 may include relational databases, such as databases provided by ORACLE®, that are adapted to store, update, and retrieve data in response to SQL-formatted commands.

Figure 17:
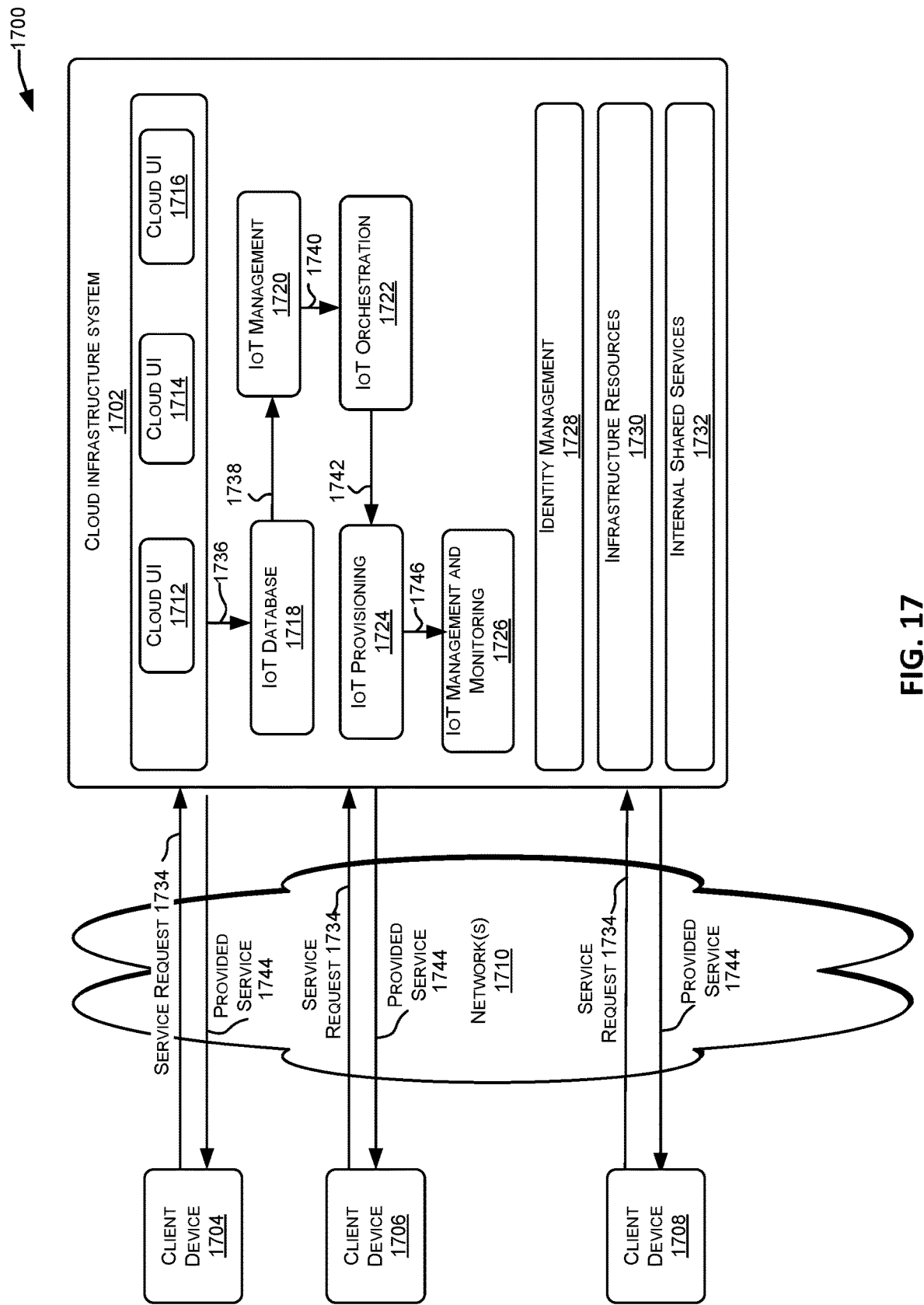
FIG. 17 is a block diagram illustrating components of a system environment by which services provided by embodiments of the present invention may be offered as cloud services.

FIG. 17 is a block diagram illustrating components of a system environment by which services provided by embodiments of the present invention may be offered as cloud services. In the illustrated embodiment, system environment 1700 includes one or more client computing devices 1704, 1706, and 1708 that may be used by users to interact with a cloud infrastructure system 1702 that provides cloud services. The client computing devices may be configured to operate a client application such as a web browser, a proprietary client application (e.g., ORACLE® Forms), or some other application, which may be used by a user of the client computing device to interact with cloud infrastructure system 1702 to use services provided by cloud infrastructure system 1702.

It should be appreciated that cloud infrastructure system 1702 depicted in the figure may have other components than those depicted. Further, the embodiment shown in the figure is only one example of a cloud infrastructure system that may incorporate an embodiment of the invention. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for 1602, 1604, 1606, and 1608.

Although exemplary system environment 1700 is shown with three client computing devices, any number of client computing devices may be supported. Other devices such as devices with sensors, etc. may interact with cloud infrastructure system 1702.

Network(s) 1710 may facilitate communications and exchange of data between clients 1704, 1706, and 1708 and cloud infrastructure system 1702. Each network may be any type of network familiar to those skilled in the art that can support data communications using any of a variety of commercially-available protocols, including those described above for network(s) 1610.

Cloud infrastructure system 1702 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the ORACLE® Public Cloud provided by the present assignee.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by ORACLE®) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order. Optionally, management of devices connected to the Internet of Things ("IoT") can be provided by cloud infrastructure system 1702. Cloud infrastructure system 1702 can perform processing to provide feature engineering as described throughout this application.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as ORACLE®) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, ORACLE® JAVA® Cloud Service (JCS), ORACLE® Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., ORACLE® Fusion Middleware services), and JAVA® cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and JAVA® cloud services may provide a platform for customers to deploy JAVA® applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform.

In some embodiments, resources in cloud infrastructure system 1702 may be shared by multiple users and dynamically re-allocated per demand. Additionally, resources may be allocated to users in different time zones. For example, cloud infrastructure system 1730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 and by the services provided by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In one embodiment, as depicted in the figure, cloud management functionality may be provided by one or more modules, such as an IoT management module 1720, an IoT orchestration module 1722, an IoT provisioning module 1724, an IoT management and monitoring module 1726, and an identity management module 1728. These modules may include or be provided using one or more computers and/or servers, which may be general purpose computers, specialized server computers, server farms, server clusters, or any other appropriate arrangement and/or combination.

In exemplary operation 1734, a customer using a client device, such as client device 1704, 1706 or 1708, may interact with cloud infrastructure system 1702 by requesting one or more services provided by cloud infrastructure system 1702 and placing a request for information related to IoT devices from one or more services offered by cloud infrastructure system 1702. In certain embodiments, the customer may access a cloud User Interface (UI), cloud UI 1712, cloud UI 1714 and/or cloud UI 1716 and place the request via these UIs. The information received by cloud infrastructure system 1702 in response to the customer placing the request may include information identifying the customer and one or more services offered by the cloud infrastructure system 1702 that the customer intends to utilize.

After the request has been placed by the customer, the IoT information is received via the cloud UIs, 1712, 1714 and/or 1716. The IoT devices (not shown) can be, for example, connected to the cloud infrastructure system 1702 through network 1710 to provide IoT data to the cloud infrastructure system 1702 for storage.

At operation 1736, the request is stored in IoT database 1718. IoT database 1718 can be one of several databases operated by cloud infrastructure system 1702 and operated in conjunction with other system elements.

At operation 1738, the IoT information is forwarded to an IoT management module 1720. In some instances, IoT management module 1720 may be configured to perform searching functions related to the request, such as verifying the request.

At operation 1740, information regarding the request is communicated to an IoT orchestration module 1722. IoT orchestration module 1722 may utilize the IoT information to orchestrate the provisioning of services and resources for the request placed by the customer. In some instances, IoT orchestration module 1722 may orchestrate the provisioning of resources to support the subscribed services using the services of IoT provisioning module 1724.

In certain embodiments, IoT orchestration module 1722 enables the management of business processes associated with each request and applies business logic to determine whether a request should proceed to provisioning. At operation 1742, upon receiving an order for a new subscription, IoT orchestration module 1722 sends a request to IoT provisioning module 1724 to allocate resources and configure those resources needed to fulfill the request. IoT provisioning module 1724 enables the allocation of resources for the services ordered by the customer. IoT provisioning module 1724 provides a level of abstraction between the cloud services provided by cloud infrastructure system 1700 and the physical implementation layer that is used to provision the resources for providing the requested services. IoT orchestration module 1722 may thus be isolated from implementation details, such as whether or not services and resources are actually provisioned on the fly or pre-provisioned and only allocated/assigned upon request.

At operation 1744, once the services and resources are provisioned, a notification of the provided service may be sent to customers on client devices 1704, 1706 and/or 1708 by IoT provisioning module 1724 of cloud infrastructure system 1702.

At operation 1746, the customer's request may be managed and tracked by an IoT management and monitoring module 1726. In some instances, IoT management and monitoring module 1726 may be configured to collect usage statistics for the services in the request, such as the amount of storage used, the amount data transferred, the number of users, and the amount of system up time and system down time.

In certain embodiments, cloud infrastructure system 1700 may include an identity management module 1728. Identity management module 1728 may be configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.) Identity management module 1728 may also include the management of descriptive information about each customer and about how and by whom that descriptive information can be accessed and modified.

Figure 18:
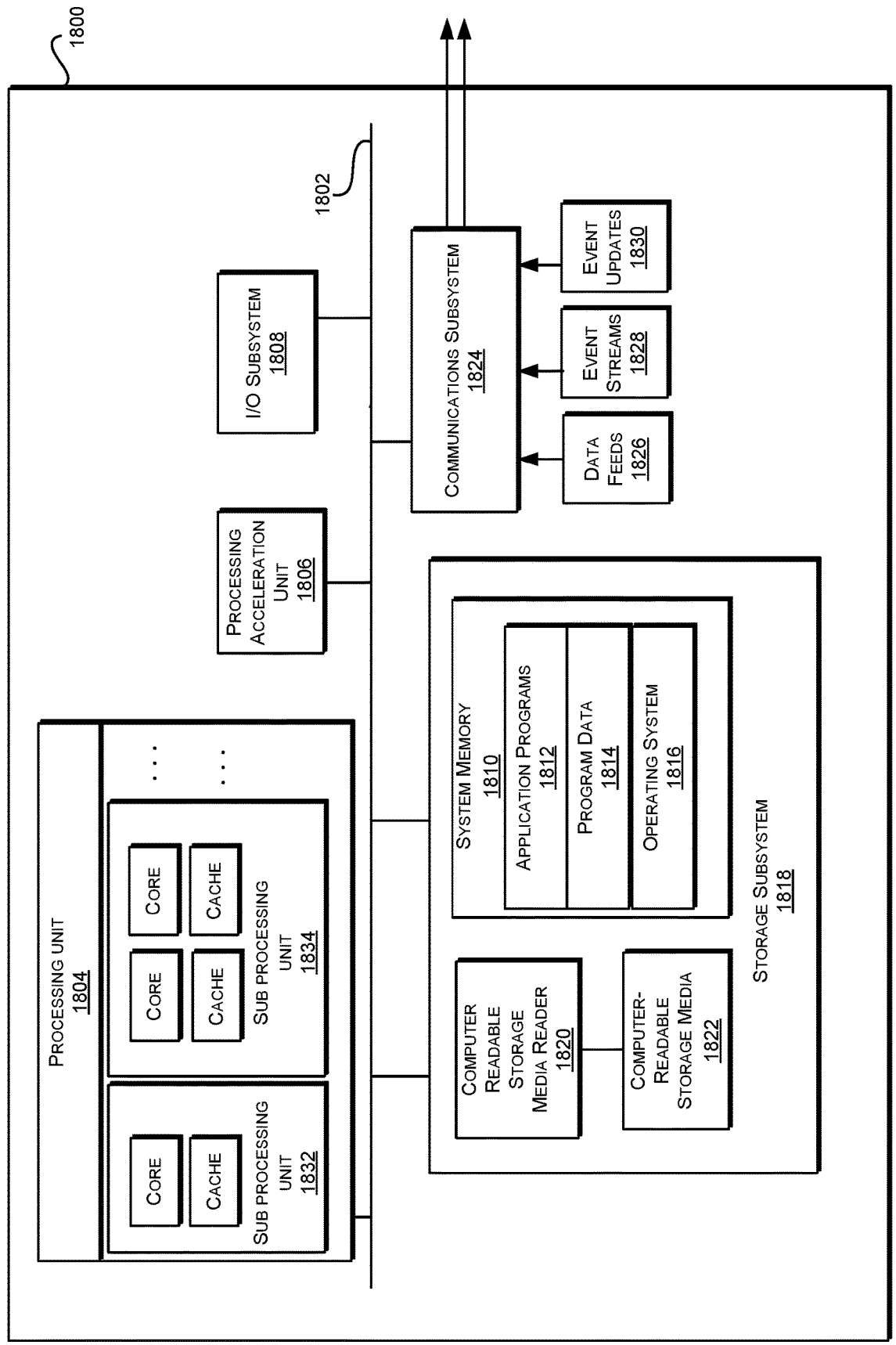
FIG. 18 is a block diagram illustrating an exemplary computer system in which embodiments of the present invention may be implemented.

FIG. 18 is a block diagram illustrating an exemplary computer system in which embodiments of the present invention may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, which can be implemented as a Mezzanine bus manufactured to the IEEE® P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs.

Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of MICROSOFT WINDOWS®, APPLE MACINTOSH®, and/or LINUX® operating systems, a variety of commercially-available UNIX® or UNIX-like operating systems (including without limitation the variety of GNU/LINUX® operating systems, the GOOGLE CHROME® OS, and the like) and/or mobile operating systems such as IOS®, WINDOWS® Phone, ANDROID® OS, BLACKBERRY® 10 OS, and PALM OS® operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with the present invention.

Storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WI-FI® (IEEE® 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other non-transitory mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for performing feature engineering of time series data, the method comprising:
   receiving, at a computer system, time series data collected from a sensor of a manufacturing machine for a period of time, the time series data providing information about the manufacturing machine for the period of time;

segmenting, by the computer system, the time series data based on business data related to the manufacturing machine for the period of time to generate contextualized data segments, the business data comprising operational data of the manufacturing machine and received from a business database;

selecting, automatically by the computer system without user input, a time window type based on the contextualized data segments;

feature windowing, by the computer system, the contextualized data segments into time windows of the time window type and based on execution data related to the manufacturing machine for the period of time to generate a plurality of windows of data, the execution data associated with execution of the manufacturing machine and received from a manufacturing database;

transforming, by the computer system, each of the plurality of windows of data into summary data using a time series transformation to generate a plurality of summary data, wherein transforming comprises:
generating a plurality of strings corresponding to the plurality of windows of data;
converting the plurality of strings into a corresponding plurality of genetic maps;
clustering the plurality of genetic maps to identify pattern similarities; and
grouping the plurality of genetic maps based on the pattern similarities; and storing, by the computer system, each of the plurality of summary data.

2. The method for performing feature engineering of time series data of claim 1, wherein generating the plurality of strings corresponding to the plurality of windows of data comprises, for each window of data in the plurality of windows of data:
normalizing the data in the window of data;
smoothing the data in the window of data using piecewise aggregate approximation; and
converting the data in the window of data into a string.

3. The method for performing feature engineering of time series data of claim 1, the method further comprising:
displaying groupings of the plurality of genetic maps to a user.

4. The method for performing feature engineering of time series data of claim 1, the method further comprising:
identifying, by the computer system, a pattern that represents an indication of a device failure;
building, by the computer system, a predictive model based on the pattern; and
sending, by the computer system, an alert based on applying the predictive model to current data.

5. The method for performing feature engineering of time series data of claim 1, the method further comprising:
receiving, by the computer system, a selection of a second time series data from a user, the second time series data related to the manufacturing machine for a second period of time;
transforming, by the computer system, the second time series data into selected summary data using the time series transformation;
searching, by the computer system, the plurality of summary data for a pattern matching at least a portion of the selected summary data; and displaying, by the computer system, summary data from the plurality of summary data having the pattern to the user.

6. The method for performing feature engineering of time series data of claim 5, the method further comprising:
predicting, by the computer system, a quality of a second product produced by the manufacturing machine during the second period of time based on a quality of a first product produced by the manufacturing machine during the period of time having the matching pattern.

7. The method for performing feature engineering of time series data of claim 1, wherein the time series transformation used is symbolic aggregate approximation ("SAX") and each of the plurality of summary data is a string in a plurality of strings.

8. The method for performing feature engineering of time series data of claim 1, wherein the time window type is one of a time segment, a sliding window, or an event.

9. The method for performing feature engineering of time series data of claim 1, wherein the business data is data from an enterprise resource planning database and the execution data is from a manufacturing execution system database.

10. A system for performing feature engineering of time series data, the system comprising:
one or more processors; and
one or more memories having stored thereon instructions that, when executed by the one or more processors, cause the one or more processors to perform operations comprising:
receiving time series data collected from a sensor of a manufacturing machine for a period of time, the time series data providing information about the manufacturing machine for the period of time;
segmenting the time series data based on business data related to the manufacturing machine for the period of time to generate contextualized data segments, the business data comprising operational data of the manufacturing machine and received from a business database;
selecting, automatically without user input, a time window type based on the contextualized data segments;
feature windowing the contextualized data segments into time windows of the time window type and based on execution data related to the manufacturing machine for the period of time to generate a plurality of windows of data, the execution data associated with execution of the manufacturing machine and received from a manufacturing database;
transforming each of the plurality of windows of data into summary data using a time series transformation to generate a plurality of summary data, wherein transforming comprises:
generating a plurality of strings corresponding to the plurality of windows of data;
converting the plurality of strings into a corresponding plurality of genetic maps;
clustering the plurality of genetic maps to identify pattern similarities; and
grouping the plurality of genetic maps based on the pattern similarities; and
storing each of the plurality of summary data.

11. The system for performing feature engineering of time series data of claim 10, wherein generating the plurality of strings corresponding to the plurality of windows of data comprises, for each window of data in the plurality of windows of data:
normalizing the data in the window of data;

smoothing the data in the window of data using piecewise aggregate approximation; and converting the data in the window of data into a string.

12. The system for performing feature engineering of time series data of claim 11, wherein the operations further comprise:

displaying groupings of the plurality of genetic maps to a user.

13. The system for performing feature engineering of time series data of claim 10, wherein the operations further comprise:

identifying a pattern that represents an indication of a device failure;

building a predictive model based on the pattern; and sending an alert based on applying the predictive model to current data.

14. The system for performing feature engineering of time series data of claim 10, wherein the operations further comprise:

receiving a selection of a second time series data from a user, the second time series data related to the manufacturing machine for a second period of time;

transforming the second time series data into selected summary data using the time series transformation;

searching the plurality of summary data for a pattern matching at least a portion of the selected summary data; and displaying summary data from the plurality of summary data having the pattern to the user.

15. The system for performing feature engineering of time series data of claim 14, wherein the operations further comprise:

predicting a quality of a second product produced by the manufacturing machine during the second period of time based on a quality of a first product produced by the manufacturing machine during the period of time having the matching pattern.

16. A non-transitory computer-readable medium comprising instructions that, when executed by one or more processors, cause the one or more processors to perform operations comprising:

receiving time series data collected from a sensor of a manufacturing machine for a period of time, the time series data providing information about the manufacturing machine for the period of time;

segmenting the time series data based on business data related to the manufacturing machine for the period of time to generate contextualized data segments, the business data comprising operational data of the manufacturing machine and received from a business database;

selecting, automatically without user input, a time window type based on the contextualized data segments;

feature windowing the contextualized data segments into time windows of the time window type and based on execution data related to the manufacturing machine for the period of time to generate a plurality of windows of data, the execution data associated with execution of the manufacturing machine and received from a manufacturing database;

transforming each of the plurality of windows of data into summary data using a time series transformation to generate a plurality of summary data, wherein transforming comprises:

generating a plurality of strings corresponding to the plurality of windows of data;

converting the plurality of strings into a corresponding plurality of genetic maps;

clustering the plurality of genetic maps to identify pattern similarities; and grouping the plurality of genetic maps based on the pattern similarities; and storing each of the plurality of summary data.

17. The non-transitory computer-readable medium of claim 16, generating the plurality of strings corresponding to the plurality of windows of data comprises, for each window of data in the plurality of windows of data:

normalizing the data in the window of data;

smoothing the data in the window of data using piecewise aggregate approximation; and converting the data in the window of data into a string.

18. The non-transitory computer-readable medium of claim 16, wherein the operations further comprise:

displaying groupings of the plurality of genetic maps to a user.

19. The non-transitory computer-readable medium of claim 16, wherein the operations further comprise:

identifying a pattern that represents an indication of a device failure;

building a predictive model based on the pattern; and sending an alert based on applying the predictive model to current data.

20. The non-transitory computer-readable medium of claim 16, wherein the operations further comprise:

receiving a selection of a second time series data from a user, the second time series data related to the manufacturing machine for a second period of time;

transforming the second time series data into selected summary data using the time series transformation;

searching the plurality of summary data for a pattern matching at least a portion of the selected summary data;

predicting a quality of a second product produced by the manufacturing machine during the second period of time based on a quality of a first product produced by the manufacturing machine during the period of time having the matching pattern; and displaying summary data from the plurality of summary data having the pattern and the predicted quality of the second product to the user.

* * * * *

UNITED STATES PATENT AND TRADEMARK OFFICE
CERTIFICATE OF CORRECTION

PATENT NO. : 10,936,600 B2
APPLICATION NO. : 15/331258
DATED : March 2, 2021
INVENTOR(S) : Hariharan et al.

Page 1 of 1

It is certified that error appears in the above-identified patent and that said Letters Patent is hereby corrected as shown below:

In the Drawings

On sheet 2 of 19, in FIG. 2, under Reference Numeral 228, Line 1, delete "No" and insert -- No. --, therefor.

On sheet 14 of 19, in FIG. 13, under Reference Numeral 1315, Line 1, delete "plurlaity" and insert -- plurality --, therefor.

In the Specification

In Column 14, Line 16, after "Electronics" insert -- Engineers --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*